US009507165B2

(12) United States Patent
Ueda et al.

(10) Patent No.: US 9,507,165 B2
(45) Date of Patent: Nov. 29, 2016

(54) STEREOSCOPIC IMAGE GENERATION APPARATUS, STEREOSCOPIC IMAGE GENERATION METHOD, AND PROGRAM

(75) Inventors: Kazuhiko Ueda, Kanagawa (JP); Masami Ogata, Kanagawa (JP); Yasunari Hatasawa, Tokyo (JP); Shinichiro Gomi, Chiba (JP); Yusuke Nakamura, Tokyo (JP)

(73) Assignee: SONY CORPORATION, Tokyo (JP)

( * ) Notice: Subject to any disclaimer, the term of this patent is extended or adjusted under 35 U.S.C. 154(b) by 671 days.

(21) Appl. No.: 12/671,367

(22) PCT Filed: Jun. 2, 2009

(86) PCT No.: PCT/JP2009/060028
§ 371 (c)(1),
(2), (4) Date: Jan. 29, 2010

(87) PCT Pub. No.: WO2009/148038
PCT Pub. Date: Dec. 10, 2009

(65) Prior Publication Data
US 2010/0201783 A1 Aug. 12, 2010

(30) Foreign Application Priority Data

Jun. 6, 2008 (JP) .................................. 2008-149123

(51) Int. Cl.
*H04N 13/02* (2006.01)
*G02B 27/22* (2006.01)
(Continued)

(52) U.S. Cl.
CPC ........... *G02B 27/2228* (2013.01); *G06T 15/20* (2013.01); *H04N 13/0402* (2013.01); *H04N 13/0459* (2013.01); *H04N 13/0475* (2013.01)

(58) Field of Classification Search
CPC .............. G02N 27/2228; G06T 15/20; H04N 13/0475; H04N 13/0459; H04N 13/0402
USPC ................. 345/419, 427, 8; 348/40, 51, 169; 600/558; 353/7; 715/848
See application file for complete search history.

(56) References Cited

U.S. PATENT DOCUMENTS 4,875,034 A * 10/1989 Brokenshire ...... H04N 13/0434
345/419
5,855,425 A * 1/1999 Hamagishi ........................ 353/7
(Continued)

FOREIGN PATENT DOCUMENTS

CN 1209248 A 2/1999
EP 1 600 890 A2 2/2005
(Continued)

OTHER PUBLICATIONS

Notification of Reason(s) for Refusal issued by the Japanese Patent Office in corresponding Japanese Patent Application No. 2008-149123, mailed Apr. 24, 2012, 11 pages.
(Continued)

*Primary Examiner* — Gims Philippe
*Assistant Examiner* — Richard Carter
(74) *Attorney, Agent, or Firm* — Oblon, McClelland, Maier & Neustadt, L.L.P.

(57) ABSTRACT

Influences of physiological stereoscopic elements are removed by image processing using projection transformation. A horopter-plane image projection unit 311 is designed to project a non-stereo image supplied via a signal line 129 onto a cylindrical plane (horopter plane) including a horopter circle. The size of the horopter circle is specified using, for example, the radius as horopter circle information. Additionally, the relationship with two eyes is specified by the interocular distance. A display surface right-eye projection unit 316 is designed to project an image projected on the horopter plane onto a display surface for the right eye. A display surface left-eye projection unit 317 is designed to project the image projected on the horopter plane onto a display surface for the left eye. Therefore, retinal images that are identical to each other are supplied to the two eyes to remove influences of physiological stereoscopic elements, and stereoscopic depth is given.

14 Claims, 29 Drawing Sheets

(51) Int. Cl.
  *G06T 15/20* (2011.01)
  *H04N 13/04* (2006.01)

(56) References Cited

U.S. PATENT DOCUMENTS

| | | | |
|---|---|---|---|
| 6,246,382 B1* | 6/2001 | Maguire, Jr. | G02B 27/2264 345/8 |
| 7,161,614 B1* | 1/2007 | Yamashita | H04N 13/026 348/42 |
| 2002/0047893 A1* | 4/2002 | Kremen | 348/40 |
| 2003/0228034 A1 | 12/2003 | Fox et al. | |
| 2004/0027346 A1 | 2/2004 | Naske | |
| 2004/0032407 A1 | 2/2004 | Ejiri et al. | |
| 2004/0102713 A1* | 5/2004 | Dunn | 600/558 |
| 2004/0145655 A1* | 7/2004 | Tomita | 348/51 |
| 2004/0239763 A1* | 12/2004 | Notea et al. | 348/169 |
| 2008/0043014 A1* | 2/2008 | Tachi | G02B 27/2214 345/419 |
| 2008/0150945 A1* | 6/2008 | Wang et al. | 345/427 |
| 2008/0158347 A1* | 7/2008 | Liu et al. | 348/51 |
| 2011/0241976 A1* | 10/2011 | Boger et al. | 345/8 |

FOREIGN PATENT DOCUMENTS

| | | |
|---|---|---|
| EP | 1 600 890 A2 | 11/2005 |
| JP | 07-167633 | 7/1995 |
| JP | 9-102052 | 4/1997 |
| JP | 2000-228748 | 8/2000 |
| JP | 2001-141417 | 5/2001 |
| JP | 2001-175885 | 6/2001 |
| JP | 2001-218231 | 8/2001 |
| JP | 2001-245322 | 9/2001 |
| JP | 2002-223458 | 8/2002 |
| JP | 2002-365593 | 12/2002 |
| JP | 2003-319418 | 11/2003 |
| JP | 2005-339313 | 12/2005 |
| JP | 2006-189962 | 7/2006 |
| JP | 2007-502454 | 2/2007 |
| JP | 2008-015359 | 1/2008 |
| JP | 2008-509438 | 3/2008 |
| WO | WO 97/24005 | 12/1996 |
| WO | WO 2005/013623 | 2/2005 |
| WO | WO 2006/017771 A1 | 2/2006 |

OTHER PUBLICATIONS

Toshifumi Inokuchi et al., "Temporal characteristics of detecting corresponding points in stereopsis", Technical Report of Institute of Image Information and Television Engineers, Japan, Institute of Image Information and Television Engineers, vol. 28, No. 63, pp. 21-24, Oct. 29, 2004.

Youhei Konishi et al., "Study on Depth Perception in Immersive Virtual Environments", Technical Report of Institute of Image Information and Television Engineers, Japan, Institute of Image Information and Television Engineers, vol. 25, No. 32, pp. 21-26, Apr. 27, 2001.

Noboru Onishi, "Biologic Information Processing (First Edition)", Shokodo Co., Ltd. (Kuniaki AI), First Edition, pp. 81-89, Apr. 20, 2001.

Norio Motoki et al., "Science of Three-Dimensional Image and Human Being (first Edition)", Ohm-Sha Ltd., First Edition, pp. 1-6, Apr. 15, 2000.

Toshiichi Oshima et al., "Gaze-directed Realtime Rendering of Hierarchical Geometric Models", Journal of Information Processing Society of Japan, Information Processing Society of Japan, vol. 38, No. 12, pp. 2499-2508, Dec. 15, 1997.

Hitoshi Ohzu et al., "Sense of Sight and Image", Morikita Shuppan Co., Ltd., First Edition, pp. 28-30, Feb. 7, 1994.

J. J. Koenderink et al., "On so-called paradoxical monocular stereoscopy", Perception, vol. 23, pp. 585-594 (1994).

English-language Supplementary European search Report in corresponding EP 09 75 8305, mailed Jul. 7, 2012.

Jan J. Koenderink, et al., "On so-called paradoxical stereoscopy," Perception (1994), vol. 23, pp. 583-594.

European Patent Office, Communication pursuant to Article 94(3) EPC for Application No. 09 758 305.8-1228, dated Sep. 4, 2012 (6 pgs).

English translation of Office Action for Application No. 201210034197.1 of State Intellectual Property Office of People's Republic of China dated Sep. 24, 2013.

Office Action issued from the European Patent Office in counterpart European Application dated Oct. 9, 2014.

Office Action issued on Mar. 24, 2015 by the Korean Intellectual Property Office in Korean Patent Application No. 10-2010-7002176, and English translation thereof.

* cited by examiner

FIG. 4
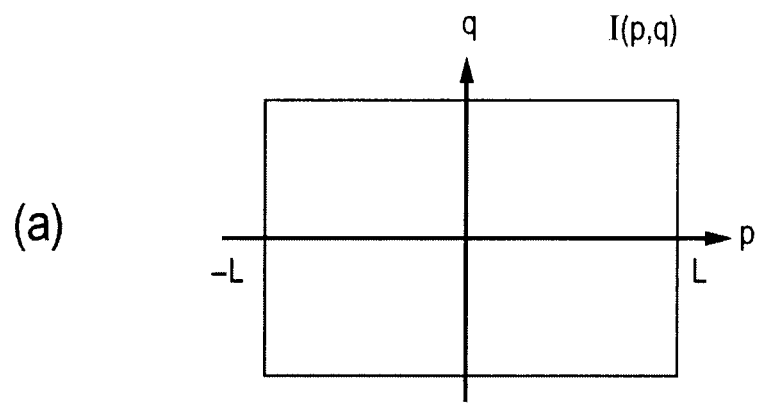
(a)
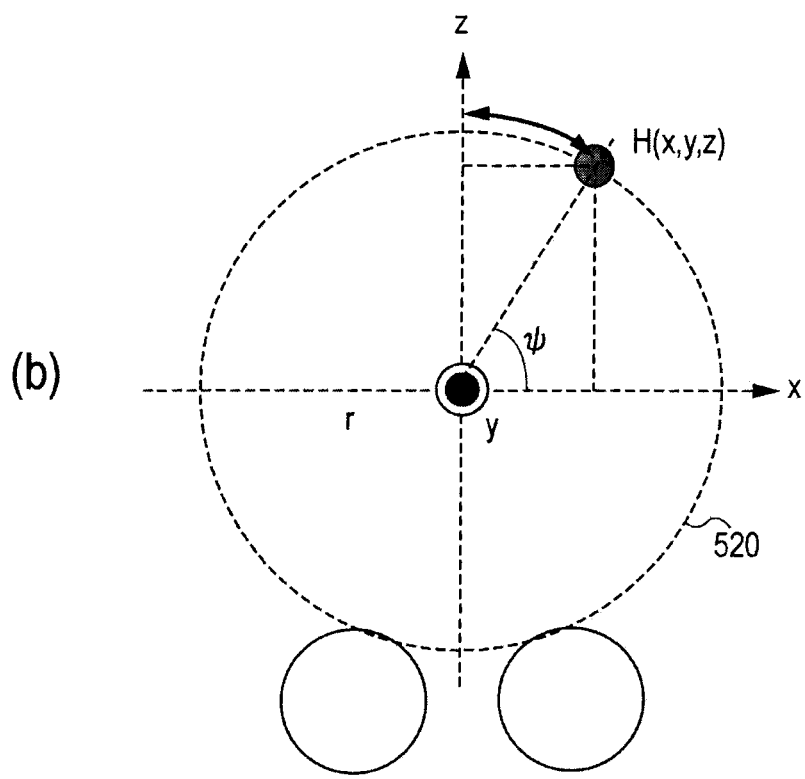
(b)

FIG. 6
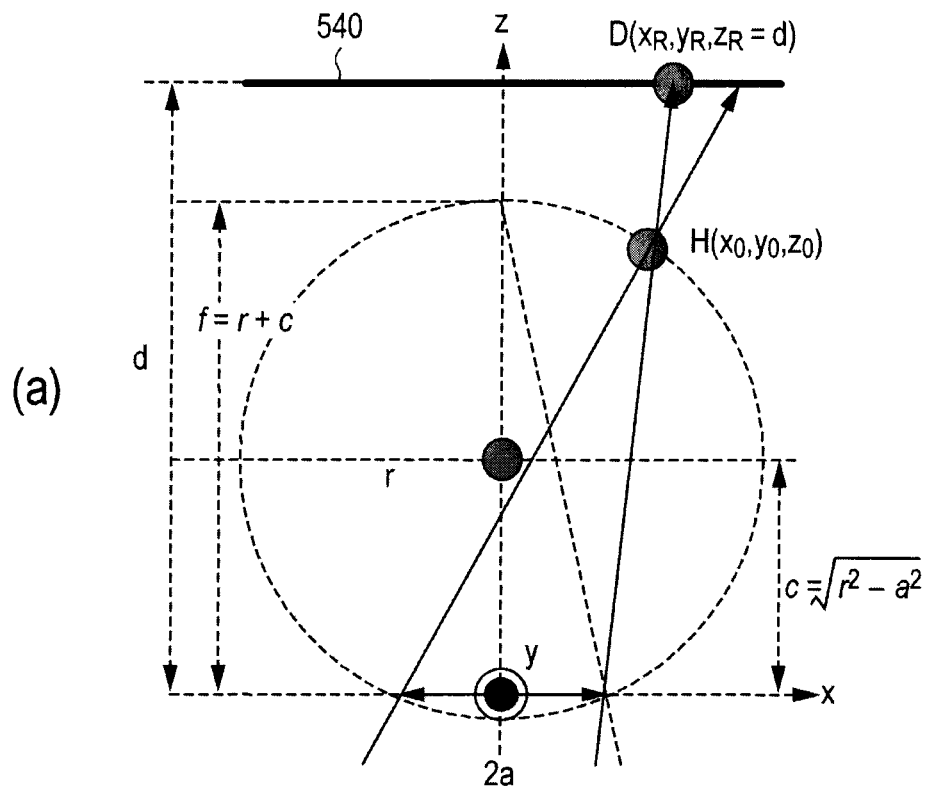
(a)
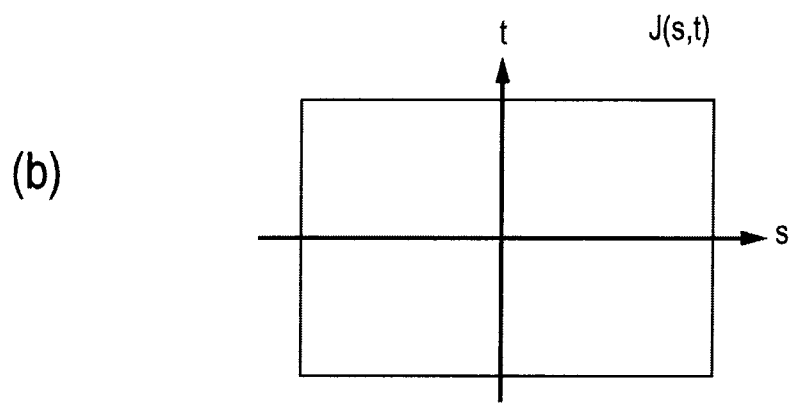
(b)

FIG. 20
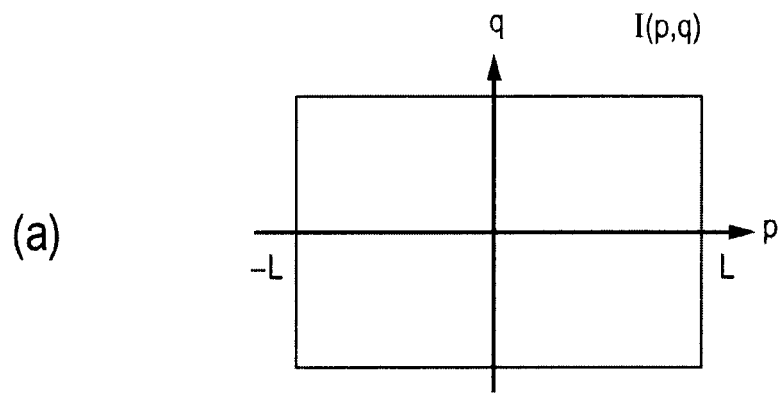
(a)
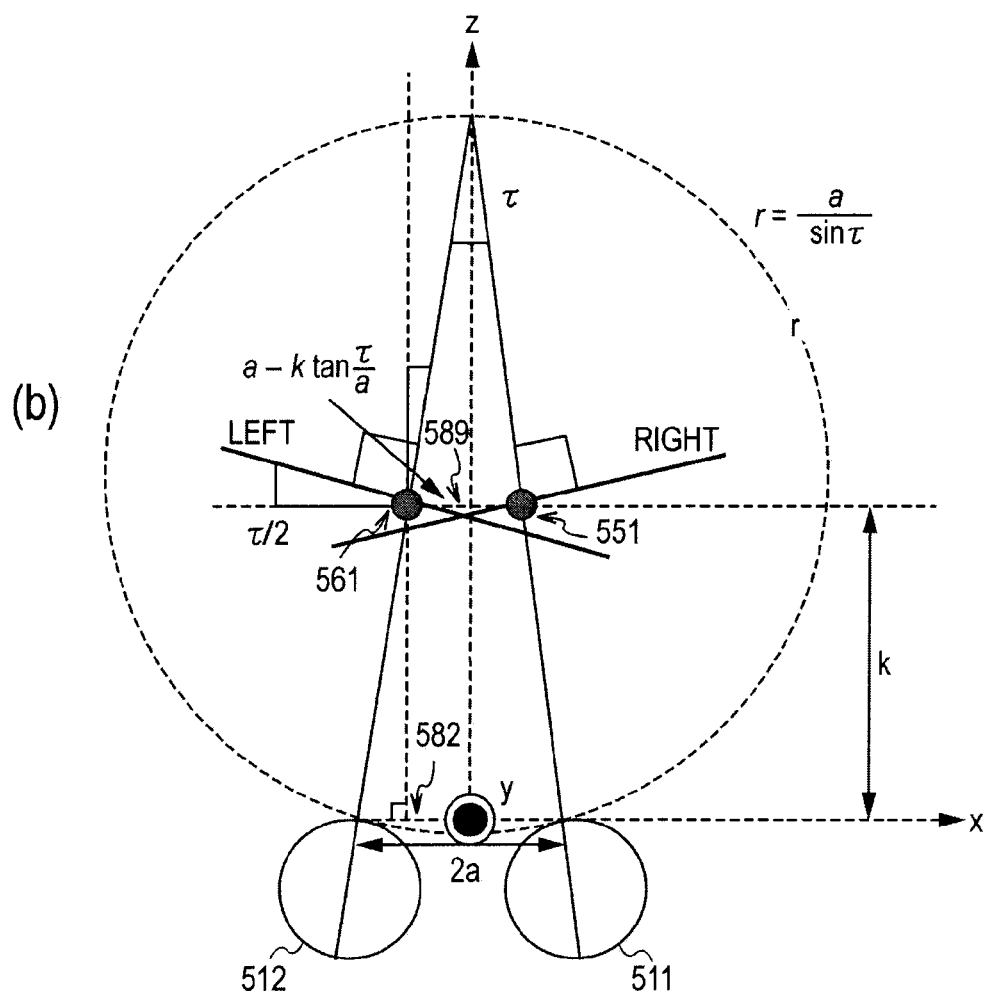
(b)

FIG. 21
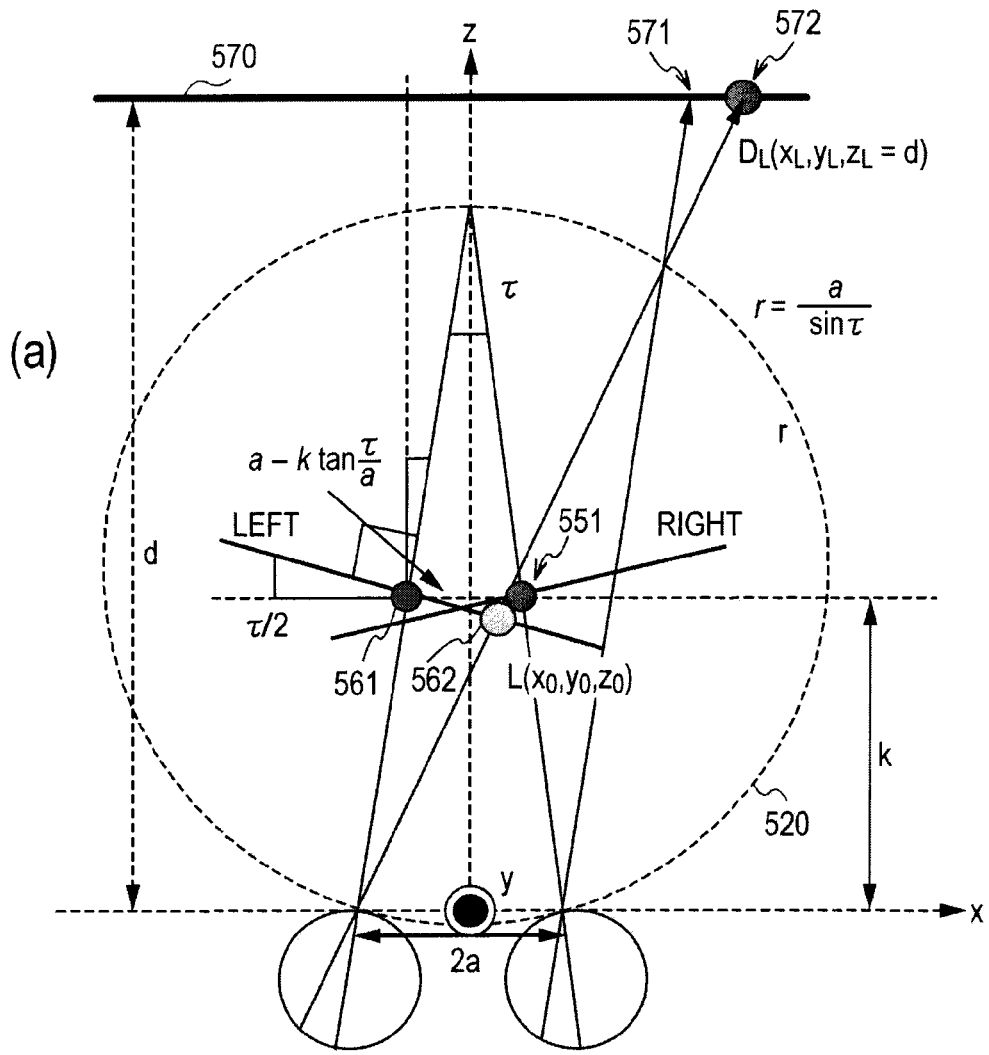
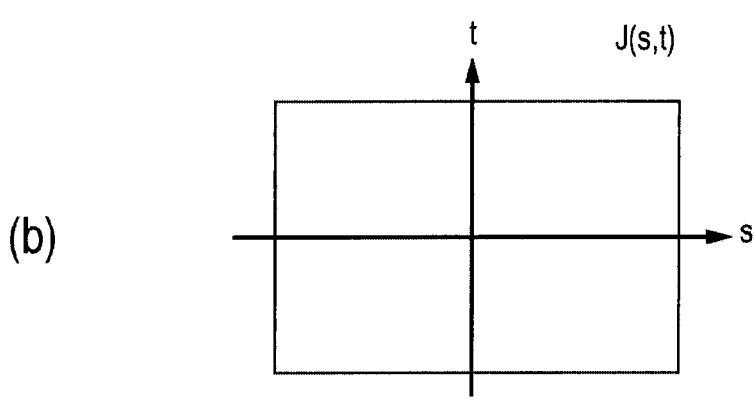

STEREOSCOPIC IMAGE GENERATION APPARATUS, STEREOSCOPIC IMAGE GENERATION METHOD, AND PROGRAM

TECHNICAL FIELD

The present invention relates to a stereoscopic image generation apparatus, more specifically, to a stereoscopic image generation apparatus that generates a stereoscopic image from a non-stereo image, a processing method therefor, and a program that causes a computer to execute this method.

BACKGROUND ART

In recent years, the size and viewing angle of display devices have increased, and the display of more realistic images than conventional ones is becoming available. In a conventional display device, however, an image is forcibly perceived as being located on the display surface of the display device, and there is a risk of stereoscopic feeling being hindered from being generated by sensory stereoscopic elements such as shadows and composition. This is considered to be affected by influences caused by physiological stereoscopic elements, such as changes in the angle of convergence caused when the display surface of the display device is viewed with two eyes and the occurrence of distortion induced by binocular disparity.

A known optical device for removing such influences caused by physiological stereoscopic elements is a stereoscope called synopter. The synopter is designed to be used with a half mirror to individually supply light received at the same position to two eyes. It is known that this synopter allows retinal images of the two eyes to be identical to each other so that stereoscopic depth can be added to a non-stereo image (see, for example, Non-Patent Document 1).

RELATED TECHNICAL DOCUMENT

Non-Patent Document

Non-Patent Document 1: Jan J Koenderink et al., "On so-called paradoxical monocular stereoscopy", Perception, Pion Publication (UK), 1994, volume 23, pp. 583-594

SUMMARY OF INVENTION

Technical Problem

In this manner, an optical device such as a synopter can remove influences caused by physiological stereoscopic elements to allow retinal images of two eyes to be identical to each other so that stereoscopic depth can be obtained from a non-stereo image. Such an optical device can realize stereoscopic vision with a simple mechanism while, on the other hand, a display device has no flexibility so that it is difficult to obtain further visual effects.

Accordingly, it is an object of the present invention to remove influences of physiological stereoscopic elements by image processing.

Technical Solution

The present invention has been made in order to solve the above problems, and a first aspect thereof provides a stereoscopic image generation apparatus including a cylindrical plane projection unit that projects a two-dimensional input image onto a cylindrical plane including an imaginary circle that is tangent to two eyes to generate a cylindrical image, and a display surface projection unit that projects the cylindrical image onto a display surface with reference to each of the two eyes to generate display images to be respectively cast on the two eyes, a stereoscopic image generation method therefor, or a program. Therefore, the effect of respectively supplying retinal images that are identical to each other to the two eyes to remove influences produced by physiological stereoscopic elements can be furnished.

Additionally, in this first aspect, the radius of the imaginary circle may be set in accordance with an assumed observation distance or a display size. Therefore, the effect of allowing an image suitable for the observation distance or display size to be displayed can be furnished. In this case, in this first aspect, the stereoscopic image generation apparatus may further include an observation distance measurement unit that measures a distance between the display surface and an observation position, and the radius of the imaginary circle may be set in accordance with an observation distance measured by the observation distance measurement unit. Therefore, the effect of allowing an image suitable for the measured observation distance to be displayed can be furnished.

Additionally, in this first aspect, the radius of the imaginary circle may be set so that a degree of distortion in the display images is smaller than a predetermined threshold. Therefore, the effect of allowing an image to be displayed within a distortion allowable range.

Additionally, in this first aspect, the stereoscopic image generation apparatus may further include a degree-of-depth information generation unit that generates degree-of-depth information using the two-dimensional input image, and a degree-of-depth information combination unit that combines the degree-of-depth information with the cylindrical image, and the display surface projection unit may project the cylindrical image with the degree-of-depth information combined therewith onto the display surface to generate the display images. Therefore, the effect of allowing an image with further enhanced stereoscopic feeling to be displayed can be furnished.

Additionally, a second aspect of the present invention provides a stereoscopic image generation apparatus including an irradiation-plane projection unit that projects a two-dimensional input image onto two-dimensional planes that are respectively perpendicular to lines of sight of two eyes to generate irradiation images respectively corresponding to the two eyes, and a display surface projection unit that projects the corresponding irradiation images onto a display surface with reference to the two eyes to generate display images to be respectively cast on the two eyes, a stereoscopic image generation method therefor, or a program. Therefore, the effect of respectively supplying retinal images that are identical to each other to the two eyes to remove influences produced by physiological stereoscopic elements can be furnished.

Additionally, in this second aspect, the positions of the irradiation images may be set in accordance with an assumed observation distance. Therefore, the effect of allowing an image suitable for the observation distance to be displayed can be furnished. In this case, in this second aspect, the stereoscopic image generation apparatus may further include an observation distance measurement unit that measures a distance between the display surface and an observation position, and the positions of the irradiation images may be set in accordance with an observation distance measured by the observation distance measurement unit. Therefore, the effect of allowing an image suitable for the measured observation distance to be displayed can be furnished.

Additionally, a third aspect of the present invention provides a stereoscopic image generation apparatus that converts a two-dimensional input image so that video images to be respectively projected onto a right eye and a left eye from a display surface become identical to each other to respectively generate a right-eye image and a left-eye image, a stereoscopic image generation method therefor, or a program. Therefore, the effect of respectively supplying retinal images that are identical to each other to the two eyes to remove influences produced by physiological stereoscopic elements can be furnished.

ADVANTAGEOUS EFFECTS

According to the present invention, the superior effect that influences of physiological stereoscopic elements can be removed by image processing can be achieved.

BRIEF DESCRIPTION OF DRAWINGS

FIG. 4 is a diagram illustrating a specific example of the projection onto the horopter plane in the first example of the three-dimensional conversion unit 130 in the embodiment of the present invention.

FIG. 6 is a diagram illustrating a specific example of the projection onto the display surface in the first example of the three-dimensional conversion unit 130 in the embodiment of the present invention.

FIG. 20 is a diagram illustrating a specific example of the projection onto the tilt-shift planes in the fifth example of the three-dimensional conversion unit 130 in the embodiment of the present invention.

FIG. 21 is a diagram illustrating a specific example of the projection onto a display surface in the fifth example of the three-dimensional conversion unit 130 in the embodiment of the present invention.

BEST MODE FOR CARRYING OUT THE INVENTION

Next, an embodiment of the present invention will be explained in detail with reference to the drawings.

Figure 1:
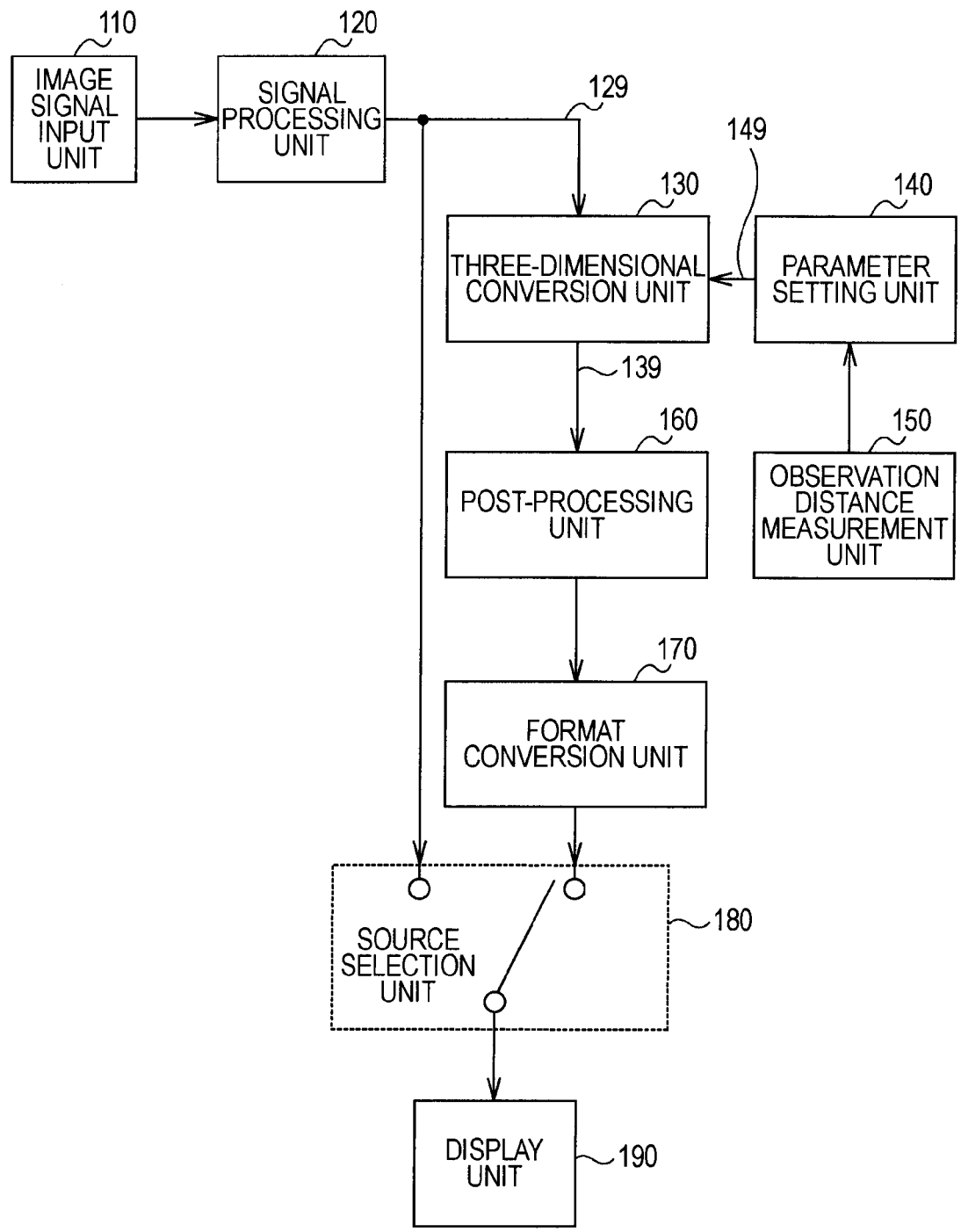
FIG. 1 is a diagram illustrating an example configuration of a stereoscopic image generation apparatus in an embodiment of the present invention.

FIG. 1 is a diagram illustrating an example configuration of a stereoscopic image generation apparatus in an embodiment of the present invention. This stereoscopic image generation apparatus includes an image signal input unit 110, a signal processing unit 120, a three-dimensional conversion unit 130, a parameter setting unit 140, an observation distance measurement unit 150, a post-processing unit 160, a format conversion unit 170, a source selection unit 180, and a display unit 190.

The image signal input unit 110 is designed to receive an input image signal of a non-stereo image. The non-stereo image to be input is not limited to a still image and may be a moving image. The source device of the non-stereo image is assumed to be a television broadcast receiver, a video reproducing device (player), an imaging device (camcorder: CAMera and reCORDER), or the like.

The signal processing unit 120 is designed to perform predetermined signal processing on an input non-stereo image. Examples of the signal processing are assumed to include white balance adjustment, noise reduction processing, level correction processing, and gamma correction processing.

The three-dimensional conversion unit 130 is a feature portion of the present invention, and is designed to convert a two-dimensional non-stereo image into a three-dimensional image. With this three-dimensional conversion processing of the three-dimensional conversion unit 130, a three-dimensional image that is based on the non-stereo image is generated. As this three-dimensional image, for example, an image for the left eye and an image for the right eye are obtained.

The parameter setting unit 140 is designed to set a parameter necessary for the three-dimensional conversion processing performed in the three-dimensional conversion unit 130. Such a parameter is assumed to be, for example, a radius for specifying a horopter circle described below, or the like.

The observation distance measurement unit 150 is designed to measure the distance between the display unit 190 and the observation position of a viewer. On the basis of the observation distance measured by this observation distance measurement unit 150, the three-dimensional conversion processing can be performed in the three-dimensional conversion unit 130. In this regard, a pre-assumed observation distance may be used without actually measuring the observation distance.

The post-processing unit 160 is designed to perform post-processing for preventing the occurrence of aliasing on the three-dimensional image obtained by the three-dimensional conversion processing performed in the three-dimensional conversion unit 130. For example, if it is assumed that the image for the left eye and the image for the right eye are alternately displayed line-by-line on the display unit 190, there is a risk of jaggy (stair-stepped edges) being displayed due to aliasing. In order to avoid it, the post-processing unit 160 applies a filter in the vertical direction to smooth the changes in the image.

The format conversion unit 170 is designed to convert the three-dimensional image into a format supported by the display unit 190. The format conversion unit 170 can perform conversion so that, for example, the image for the left eye and the image for the right eye can be alternately arranged line-by-line in accordance with the format supported by the display unit 190.

The source selection unit 180 is designed to select, as a source, an image to be displayed. That is, the source selection unit 180 selects the output of the signal processing unit 120 in a case where the non-stereo image is to be displayed without changes, and selects the output of the format conversion unit 170 in a case where the three-dimensional image for stereoscopic vision is to be displayed.

The display unit 190 is a display that displays an image. While it is assumed here as a premise that the display unit 190 has a function for displaying a three-dimensional image for stereoscopic vision, a means for implementing this function is not specifically limited. For example, as described in Japanese Unexamined Patent Application Publication No. 2002-365593, it is conceivable that separated wavelength plates are disposed every other line to convert linearly polarized light rays from even-numbered lines and odd-numbered lines of the display screen into light rays that are perpendicular to each other to allow the light rays of different images to enter the two eyes.

Figure 2:
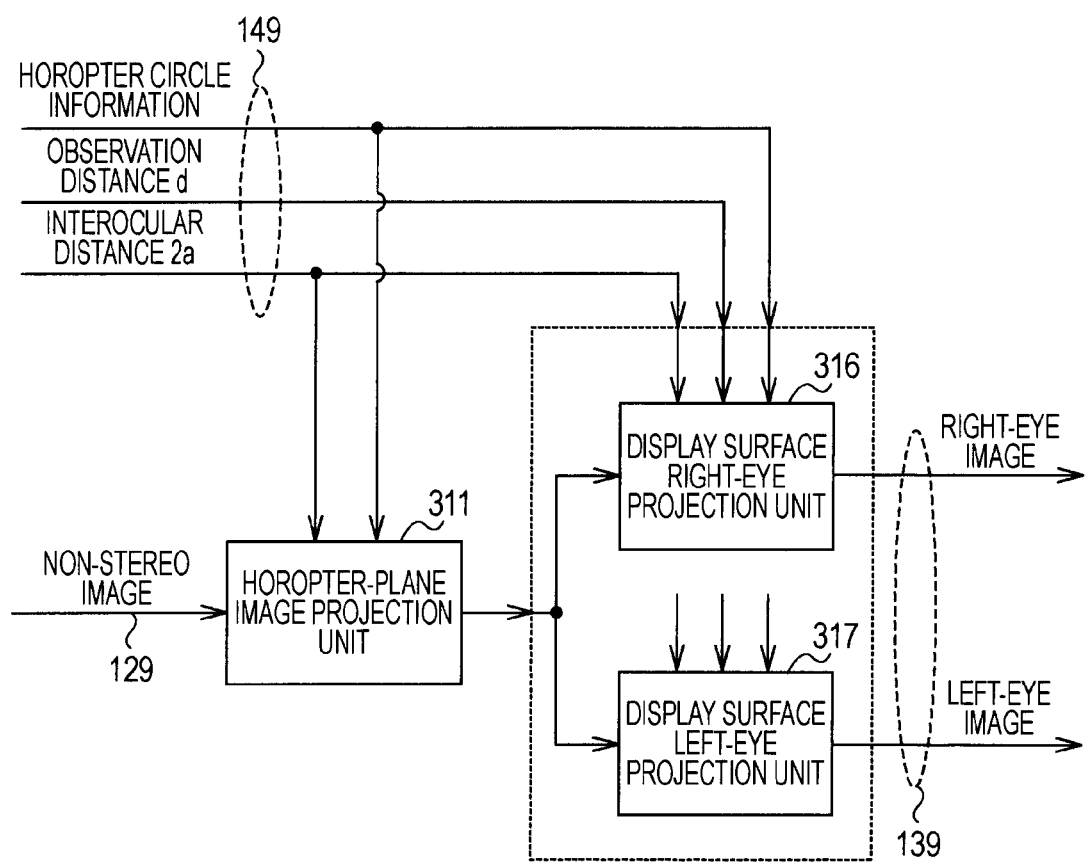
FIG. 2 is a diagram illustrating a first example of a three-dimensional conversion unit 130 in the embodiment of the present invention.

FIG. 2 is a diagram illustrating a first example of the three-dimensional conversion unit 130 in the embodiment of the present invention. This first example of the three-dimensional conversion unit 130 includes a horopter-plane image projection unit 311, a display surface right-eye projection unit 316, and a display surface left-eye projection unit 317.

The horopter-plane image projection unit 311 is designed to project the non-stereo image supplied from the signal processing unit 120 via a signal line 129 onto a cylindrical plane including a horopter circle (horopter). The term horopter circle is a circumference that is tangent to the two eyes, and it is known that binocular retinal images with respect to a point on this horopter circle are identical to each other. This cylindrical plane is referred to as a horopter plane, and an image projected onto the horopter plane is referred to as a horopter image. Additionally, an intersection of the lines of sight of the two eyes is referred to as a point of convergence, and the angle defined thereby is referred to as a convergence angle or an angle of circumference. Convergence angles are equal on the horopter circle. In this first example, the size of the horopter circle is specified by horopter circle information. Additionally, the relative positional relationship with the two eyes is specified by an interocular distance "2a". The horopter circle information and the interocular distance "2a" are supplied from the parameter setting unit 140 via a signal line 149. Note that while in the following, the size of the horopter circle is specified using a radius "r" as horopter circle information, the size of the horopter circle may be specified using the distance from the center of the two eyes to a vertex of the horopter circle, the angle of circumference, or the like. Note that the horopter-plane image projection unit 311 is an example of the cylindrical plane projection unit described in CLAIMS.

The display surface right-eye projection unit 316 is designed to project the horopter image onto a display surface for the right eye. The display surface left-eye projection unit 317 is designed to project the horopter image onto a display surface for the left eye. The display surface right-eye projection unit 316 and the display surface left-eye projection unit 317 perform projection onto the display surfaces for the right and left eyes on the basis of the interocular distance "2a", the radius "r" of the horopter circle, and an assumed observation distance "d". An image projected onto the display surface for the right eye is referred to as a right-eye image, and an image projected onto the display surface for the left eye is referred to as a left-eye image. The right-eye image and the left-eye image are supplied to the post-processing unit 160 via a signal line 139. Note that the display surface right-eye projection unit 316 and the display surface left-eye projection unit 317 are examples of the display surface projection unit described in CLAIMS.

Figure 3:
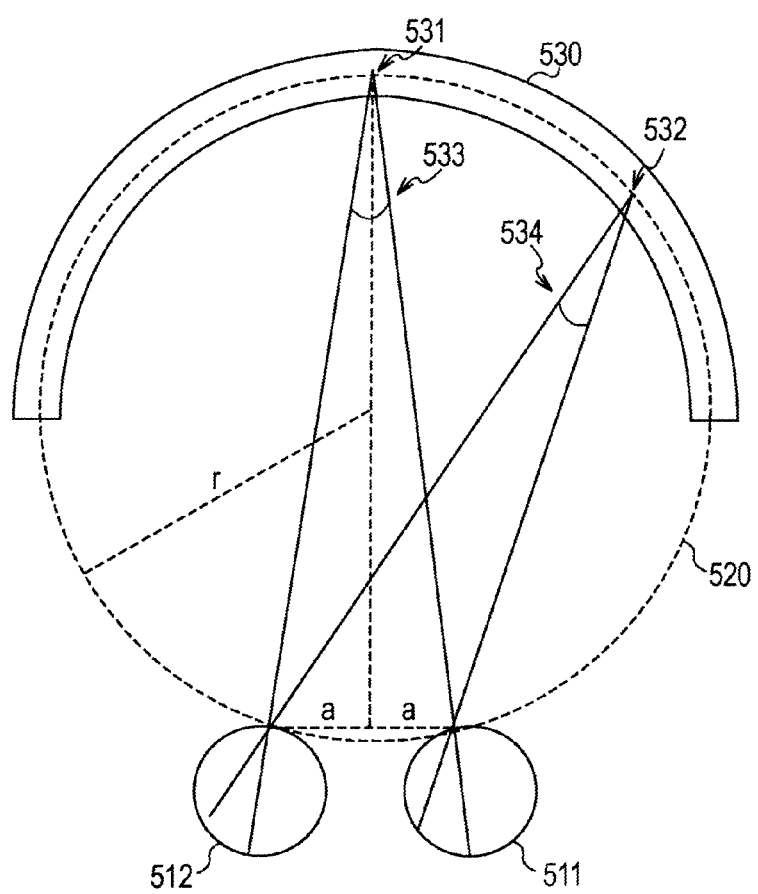
FIG. 3 is a diagram illustrating one form of the projection onto a horopter plane in the first example of the three-dimensional conversion unit 130 in the embodiment of the present invention.

FIG. 3 is a diagram illustrating one form of the projection onto the horopter plane in the first example of the three-dimensional conversion unit 130 in the embodiment of the present invention. A horopter circle 520 is a circle that passes through a right eye 511, a left eye 512, and a point of convergence 531 (vertex) or 532. Here, it is assumed that the right eye 511 and the left eye 512 are each spaced apart from each other by "a" with respect to the center of the two eyes. That is, the interocular distance is "2a". Additionally, the radius of the horopter circle 520 is "r".

The binocular retinal images of the right eye 511 and the left eye 512 with respect to a point on the horopter circle 520 are identical to each other. This is because convergence angles are always equal in a case where points on the horopter circle 520 are set as points of convergence. For example, a convergence angle 533 with respect to the point of convergence 531 and a convergence angle 534 with respect to the point of convergence 532 are equal to each other. A non-stereo image is projected as a horopter image 530 onto a cylindrical plane (horopter plane) including the horopter circle 520. Thus, retinal images that are identical to each other and that have no binocular disparity can be formed on the right eye 511 and the left eye 512.

FIG. 4 is a diagram illustrating a specific example of the projection onto the horopter plane in the first example of the three-dimensional conversion unit 130 in the embodiment of the present invention.

Part (a) of FIG. 4 illustrates the coordinate system of an input image I(p, q) supplied from the signal processing unit 120 via the signal line 129. Since the input image is a non-stereo image, the two-dimensional coordinate system is used. The origin of the coordinate system is set to the center point of the input image. Additionally, the input image size (width) is assumed to be "2L".

Part (b) of FIG. 4 illustrates the coordinate system of the horopter plane on which the horopter image 530 is projected. Since the horopter plane is three-dimensional, the three-dimensional (x, y, z) coordinate system is used here. The origin of the coordinate system is set to the center of the horopter circle 520. Part (b) of FIG. 4 is a figure viewed from a direction perpendicular to the horopter plane, that is, a direction perpendicular to the y axis.

At this time, a horopter image H(x, y, z) is obtained by projecting the input image I(p, q) onto the horopter circle having the radius r, and is represented by the following equation:

$$H(x,y,z)=I((\pi/2-\psi)\times r, y)$$

where $$z^2+x^2=r^2$$

$$\psi=\tan^{-1}(z/x)$$

Note that while it is assumed here that the input image size (width) "2L" is the same as the display surface size (width), a function for scaling up or down an input image may be provided in a preceding stage so as to change the physical size of the image.

Figure 5:
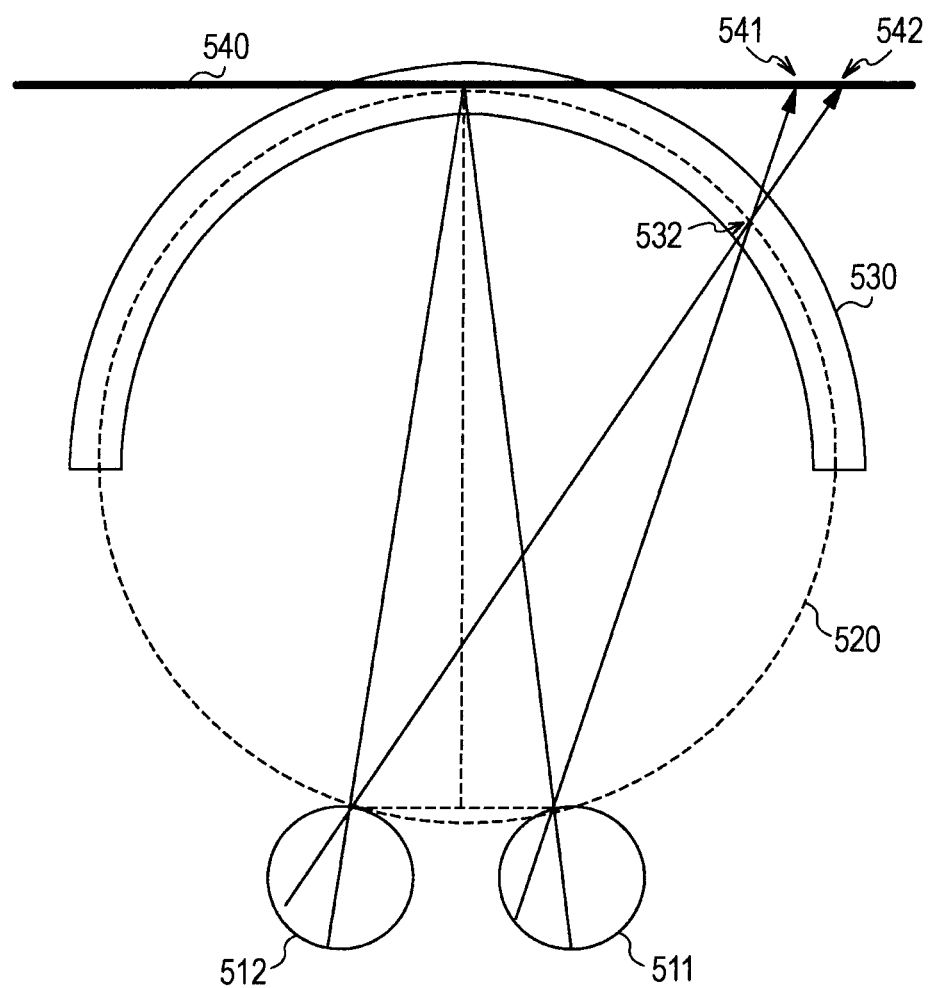
FIG. 5 is a diagram illustrating one form of the projection onto a display surface in the first example of the three-dimensional conversion unit 130 in the embodiment of the present invention.

FIG. 5 is a diagram illustrating one form of the projection onto a display surface in the first example of the three-dimensional conversion unit 130 in the embodiment of the present invention.

Here, it is considered that the point of convergence 532 on the horopter circle 520 is projected onto a display surface 540. An image formed on the right eye 511 with respect to the point of convergence 532 is displayed at a display position 541 on the display surface 540. On the other hand, an image formed on the left eye 512 with respect to the point of convergence 532 is displayed at a display position 542 on the display surface 540. That is, even for the same horopter image 530, images to be displayed on the display surface 540 are basically different images for the right eye 511 and the left eye 512.

FIG. 6 is a diagram illustrating a specific example of the projection onto the display surface in the first example of the three-dimensional conversion unit 130 in the embodiment of the present invention.

Part (a) of FIG. 6 illustrates the coordinate system on the horopter plane and the display surface. While the three-dimensional (x, y, z) coordinate system is used here, unlike the case in part (a) of FIG. 4, the position of the origin on the xy plane is set to an intermediate point between the right eye 511 and the left eye 512. Here, the distance c between the origin in this coordinate system and the center of the horopter circle 520 is expressed by:

$$c=(r^2-a^2)^{1/2}$$

Part (b) of FIG. 6 illustrates the coordinate system of a display image J(s, t) projected on a display surface. Display images are respectively obtained for the right eye 511 and the left eye 512. Since each image is a two-dimensional image, the two-dimensional coordinate system is used. The origin of the coordinate system is set to the center point of the display images.

At this time, a position $D(x_R, y_R, z_R)$ on the display surface 540, which is projected from the right eye 511 through a position $H(x_0, y_0, z_0)$ on the horopter image is given by the following equation:

$$D(x_R,y_R,z_R)=J(x_R,y_R)=H(x_0,y_0,z_0)$$

Additionally, since the distance from the observation position of the viewer is equal to the observation distance d, $z_R=d$ is obtained and the following expressions hold true:

$$(x_0-a)/(x_R-a)=y_0/y_R=z_0/d$$

$$x_0^2+(z_0-c)^2=r^2$$

$$z_0>0$$

Accordingly, an image to be projected at the position $D(x_R, y_R, z_R)$ on the display surface 540 can be determined using the position $H(x_0, y_0, z_0)$. That is, $\{x_0, y_0, z_0\}$ is obtained from $\{x_R, y_R, z_R\}$.

Note that while the position $D(x_R, y_R, z_R)$, which is projected from the right eye 511, has been explained here, a position $D(x_L, y_L, z_L)$ on the display surface 540, which is projected from the left eye 512 through the position $H(x_0, y_0, z_0)$ on the horopter image, can also be determined in a similar manner.

Additionally, while the explanation has been given of an example where the size of the horopter circle is specified by the radius "r" by way of example, as described above, the size of the horopter circle may be specified using the distance from the center of the two eyes to the vertex of the horopter circle, the angle of circumference, or the like. The distance f from the center of the two eyes to the point of convergence is given by the following equation:

$$f = r + c$$
$$= r + (r^2 - a^2)^{1/2}$$

Moving r to the left side and squaring both sides yield:

$$f^2 - 2rf + r^2 = r^2 - a^2$$

$$r = (f^2 + a^2)/2f$$

Figure 15:
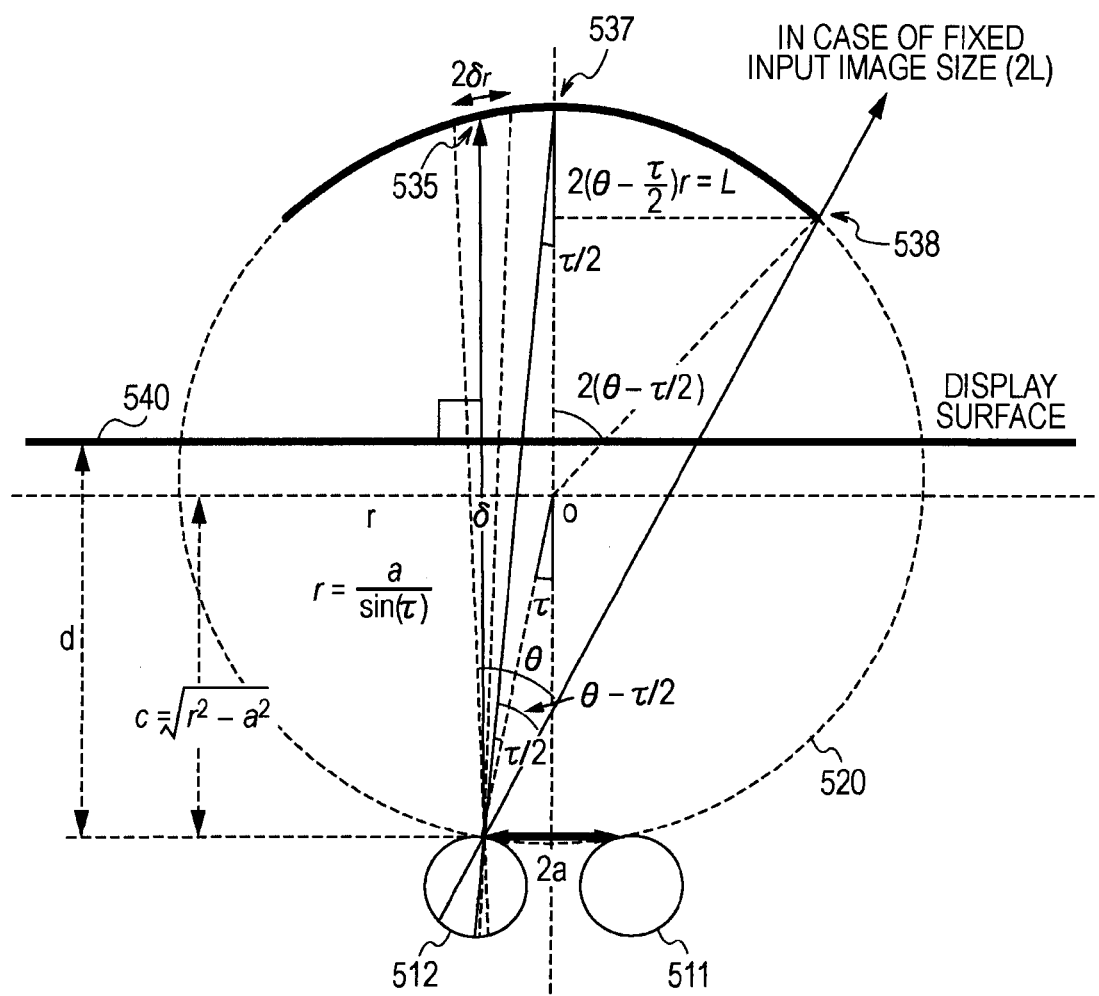
FIG. 15 is a diagram illustrating an example of the relationship between a horopter circle and an angle of circumference.

Thus, the radius "r" can be determined using the distance "f" from the center of the two eyes to the point of convergence and the interocular distance "2a". The relationship between the angle of circumference and the radius will be explained in the following example (FIG. 15).

Figure 7:
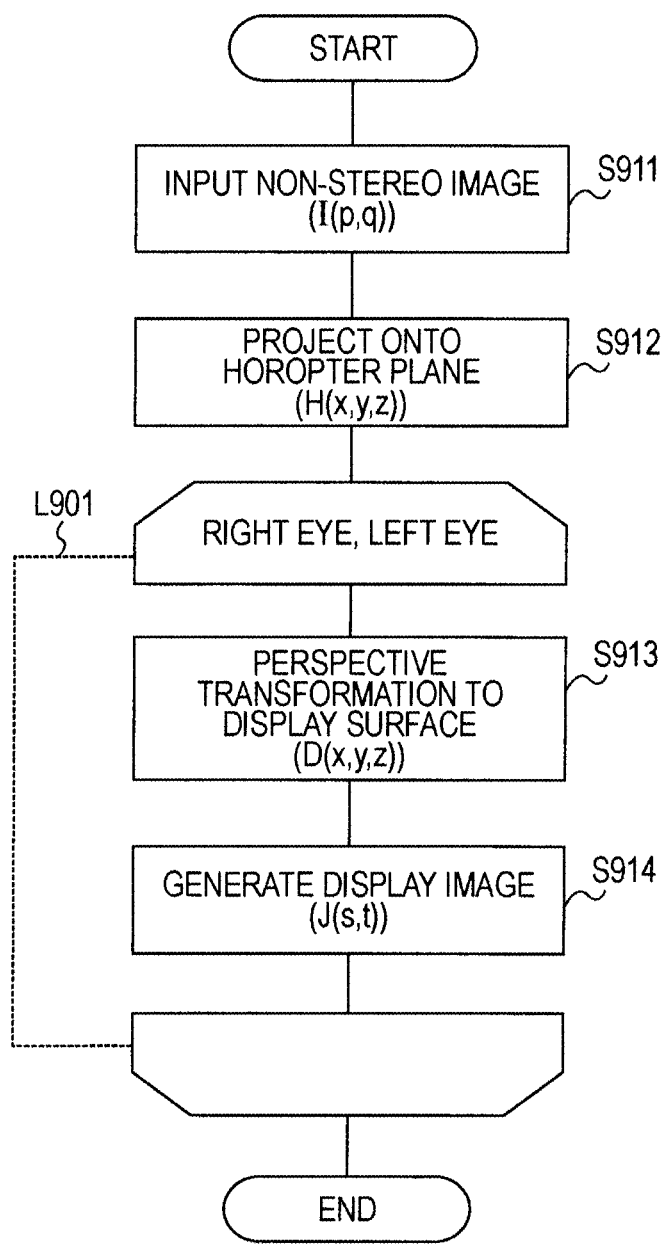
FIG. 7 is a diagram illustrating an exemplary processing procedure performed by the first example of the three-dimensional conversion unit 130 in the embodiment of the present invention.

FIG. 7 is a diagram illustrating an exemplary processing procedure performed by the first example of the three-dimensional conversion unit 130 in the embodiment of the present invention.

First, when an input image I(p, q) is input from the signal processing unit 120 via the signal line 129 (step S911), the input image I(p, q) is projected as a horopter image H(x, y, z) onto the horopter plane (step S912). Note that step S912 is an example of the cylindrical plane projecting procedure described in CLAIMS.

Then, display images are respectively generated for the right eye and the left eye in the following manner (loop L901). First, perspective transformation is performed for the display surface 540 on which the image is to be projected from the right eye 511 through the position $H(x_0, y_0, z_0)$ on the horopter image to obtain the three-dimensional position $D(x_R, y_R, z_R)$ (step S913). Then, a two-dimensional display image $J(x_R, y_R)$ for the display surface is obtained from this three-dimensional position (step S914). Similarly, perspective transformation is performed for the display surface 540 on which the image is to be projected from the left eye 512 through the position $H(x_0, y_0, z_0)$ on the horopter image to obtain the three-dimensional position $D(x_L, y_L, z_L)$ (step S913). Then, a two-dimensional display image $J(x_L, y_L)$ for the display surface is obtained from this three-dimensional position (step S914). Note that steps S913 and S914 are examples of the display-surface projecting procedure described in CLAIMS.

In this manner, in the first example of the three-dimensional conversion unit 130 in the embodiment of the present invention, a non-stereo image is projected as a horopter image onto the horopter circle 520 specified by horopter circle information. Then, the horopter image is projected onto a display surface located at an actually measured or estimated observation distance. Therefore, a stereo image for the right eye 511 and the left eye 512 can be generated.

Figure 8:
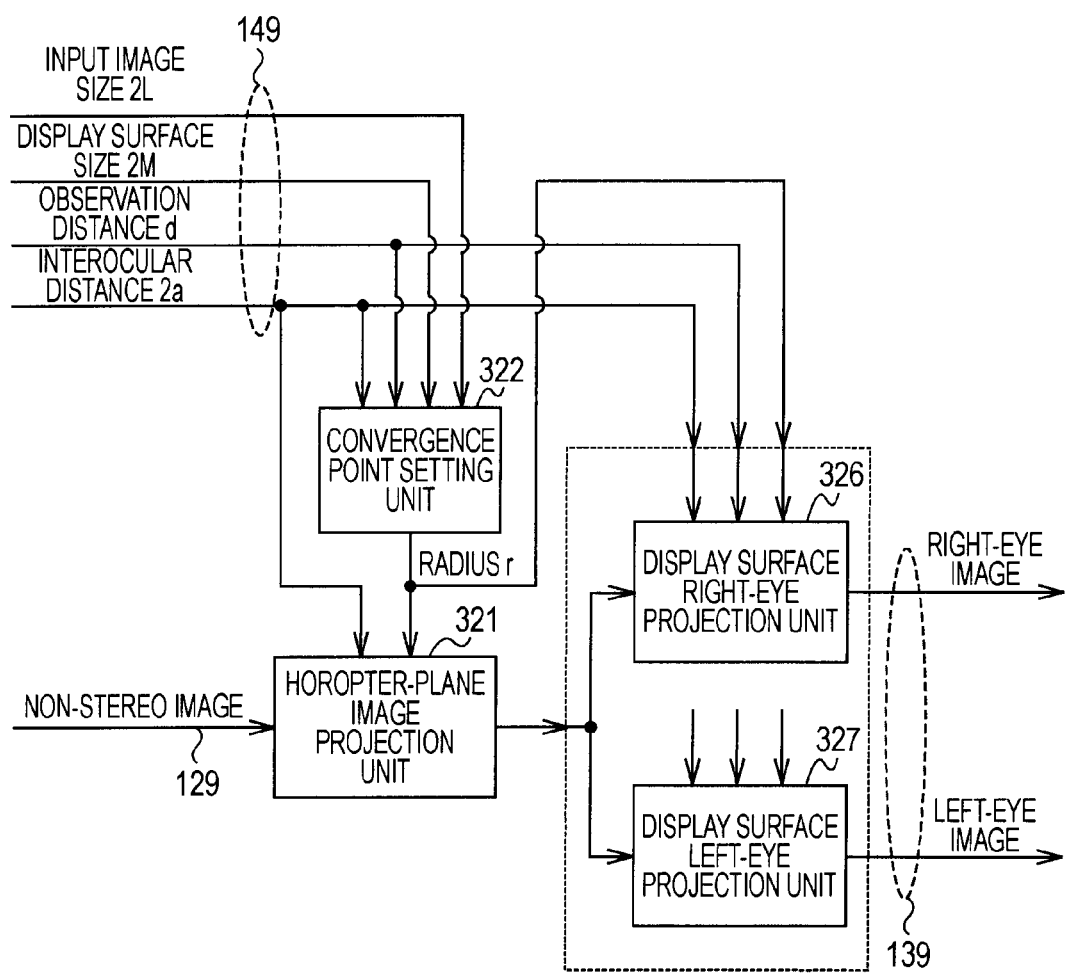
FIG. 8 is a diagram illustrating a second example of the three-dimensional conversion unit 130 in the embodiment of the present invention.

FIG. 8 is a diagram illustrating a second example of the three-dimensional conversion unit 130 in the embodiment of the present invention. This second example of the three-dimensional conversion unit 130 includes a horopter-plane image projection unit 321, a convergence point setting unit 322, a display surface right-eye projection unit 326, and a display surface left-eye projection unit 327.

Like the horopter-plane image projection unit 311, the horopter-plane image projection unit 321 is designed to project the non-stereo image supplied from the signal processing unit 120 via the signal line 129 onto a cylindrical plane including a horopter circle. In this second example, the horopter circle is specified using a radius "r" that is based on a point of convergence set by the convergence point setting unit 322. Note that the horopter-plane image projection unit 321 is an example of the cylindrical plane projection unit described in CLAIMS.

The convergence point setting unit 322 is designed to set a point of convergence and to supply a radius "r" that is based on this point of convergence. The convergence point setting unit 322 sets a point of convergence using the interocular distance "2a", the observation distance "d", the display surface size "2M", and the input image size "2L".

Similarly to the first example, the display surface right-eye projection unit 326 and the display surface left-eye projection unit 327 are designed to project the horopter image on the display surface for the right eye or the left eye. Note that the display surface right-eye projection unit 326 and the display surface left-eye projection unit 327 are examples of the display surface projection unit described in CLAIMS.

Figure 9:
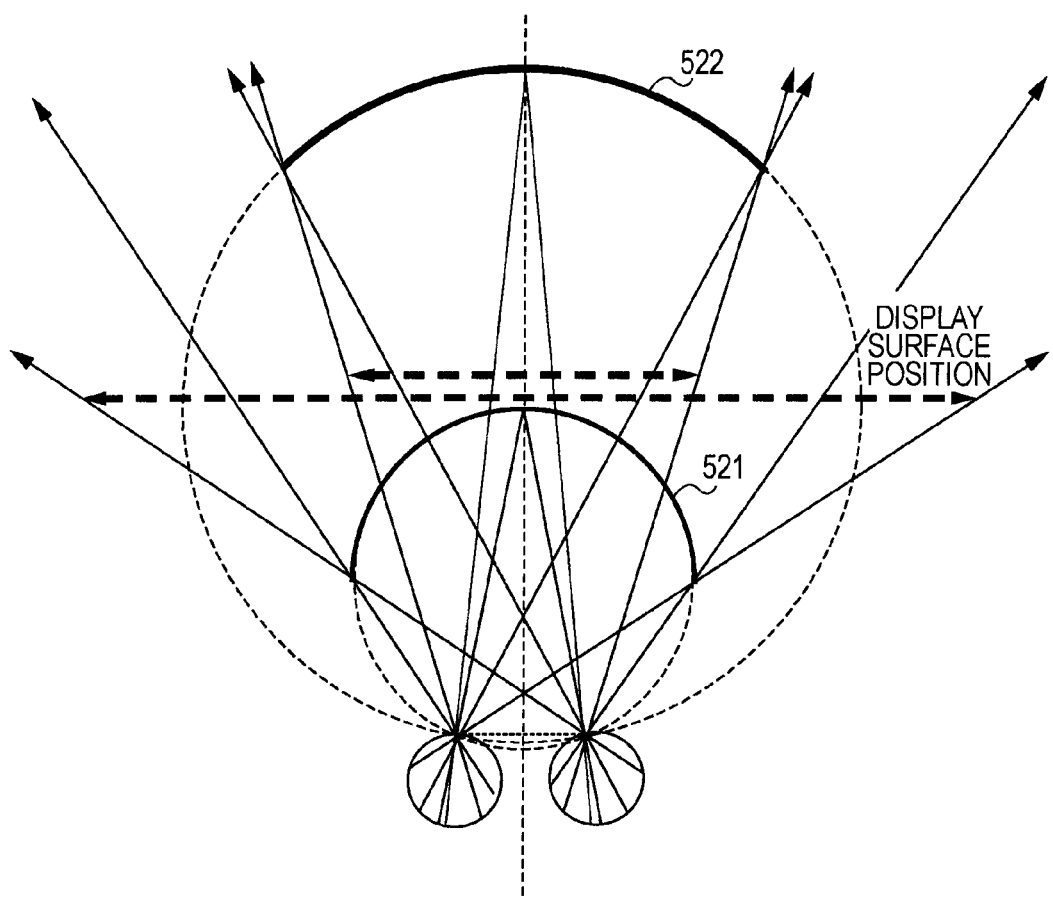
FIG. 9 is a diagram illustrating the relationship between the size of a horopter circle and the positions of points of convergence.

FIG. 9 is a diagram illustrating the relationship between the size of the horopter circle and the positions of points of convergence. The horopter circle is uniquely specified by the interocular distance and the radius. Therefore, in a case where the radius is not fixed, as in the same figure, a number of horopter circles that pass through the two eyes can be assumed. In general, the smaller the distance to the point of convergence, the larger the convergence angle, and therefore the smaller the radius.

Here, it is understood that if an input image is projected onto a horopter circle with the size of the input image fixed, as in the same figure, the size (width) thereof on the display surface differs from one horopter circle to another. That is, as in a horopter circle 521, the smaller the distance to the point of convergence, the larger the size (width) of the display surface. As in a horopter circle 522, the larger the distance to the point of convergence, the smaller the size (width) of the display surface. In the second example, therefore, for the purpose of displaying an input image across the entirety of the display surface, the point of convergence on a horopter circle is calculated back from the projection size on the display surface and set.

Figure 10:
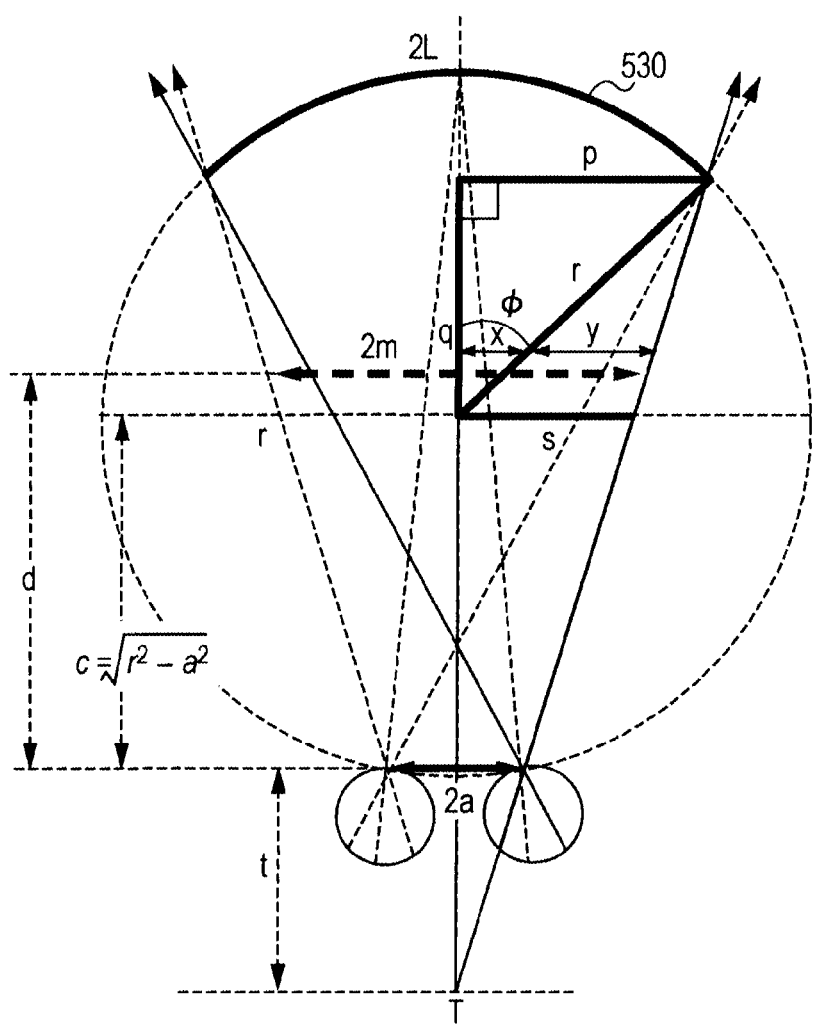
FIG. 10 is a diagram illustrating one form of the projection onto a horopter plane in the second example of the three-dimensional conversion unit 130 in the embodiment of the present invention.

FIG. 10 is a diagram illustrating one form of the projection onto the horopter plane in the second example of the three-dimensional conversion unit 130 in the embodiment of the present invention. Here, first, letting the input image size (width) be "2L", a consideration is given of the equation by which the size (width) "2m" of an image projected on the display surface is represented.

Assuming a right triangle defined by sides of lengths p, q, and r inside a horopter circle, p and q are represented by the following equations:

$$p = r \cdot \sin \phi$$

$$q = r \cdot \cos \phi$$

where $\phi$ is the angle that is an angle defined by the sides of the lengths q and r. The angle $\phi$ is represented by the following equation:

$$\phi = (L/(2\pi r)) \cdot 2\pi = L/r$$

Additionally, it is assumed that within the size (width) "2m" of the image projected on the display surface, a portion that overlaps the right triangle described above is x and a right portion thereof is y. From the similarity in the right triangle, the following relationship is obtained:

$$p:x = q:(d-c)$$

Therefore, x is given by the following equation:

$$x = p \cdot (d-c)/q$$

Additionally, from the similarity in a right triangle with a vertex T, the following relationships are obtained:

$$t:a = (t+c):s$$

$$t:a = (t+c+q):p$$

Therefore, s is given by the following equation:

$$s = ((p-a)/(a\cdot(c+q)))\cdot((a\cdot(c+q)/(p-a))+c)\cdot a$$
$$= (a\cdot q - c\cdot p)/(c+q)$$

Additionally, from the similarity in a triangle formed by sides of the length s and the radius r, the following relationship is obtained:

$$s{:}y=q{:}(q-(d-c))$$

Therefore, y is given by the following equation:

$$y = ((q-d+c)/q)\cdot s$$
$$= ((q-d+c)\cdot(a\cdot q - c\cdot p))/(q\cdot(c+q))$$

The sum of x and y obtained in this manner equals one half the size (width) of the image projected on the display surface, "m".

$$m = x + y$$
$$= p\cdot(d-c)/q + ((q-d+c)\cdot(a\cdot q - c\cdot p))/(q\cdot(c+q))$$

Figure 11:
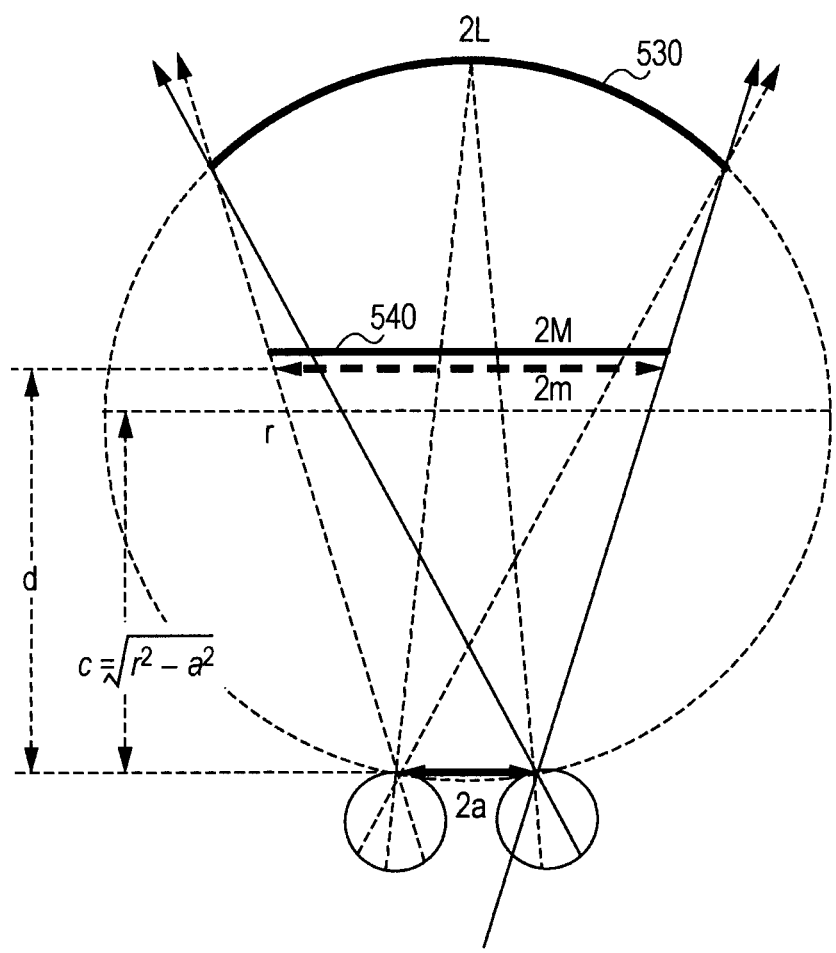
FIG. 11 is a diagram illustrating a specific example of the projection onto the horopter plane in the second example of the three-dimensional conversion unit 130 in the embodiment of the present invention.

FIG. 11 is a diagram illustrating a specific example of the projection onto the horopter plane in the second example of the three-dimensional conversion unit 130 in the embodiment of the present invention. In the second example, as described above, the point of convergence is set so that the projection width on the display surface 540 can be made to extend across the entirety of the display surface 540. Therefore, as illustrated in the same figure, the width "2M" of the display surface 540 itself is made to match the display-surface projection width "2m" obtained by the above equation.

Since the size (width) "2M" of the display surface 540, the input image size (width) "2L", the interocular distance "2a", and the observation distance "d" are given to the convergence point setting unit 322, the radius r of the horopter circle can be determined so that the display-surface projection size (width) "2m" obtained by the above equation can be made to match "2M".

In this manner, in the second example of the three-dimensional conversion unit 130 in the embodiment of the present invention, by assuming the size of the display surface 540 in advance, a point of convergence can be set so that a projected image on the display surface 540 can be displayed on the entirety of the display surface 540, and the horopter circle can be uniquely specified.

Figure 12:
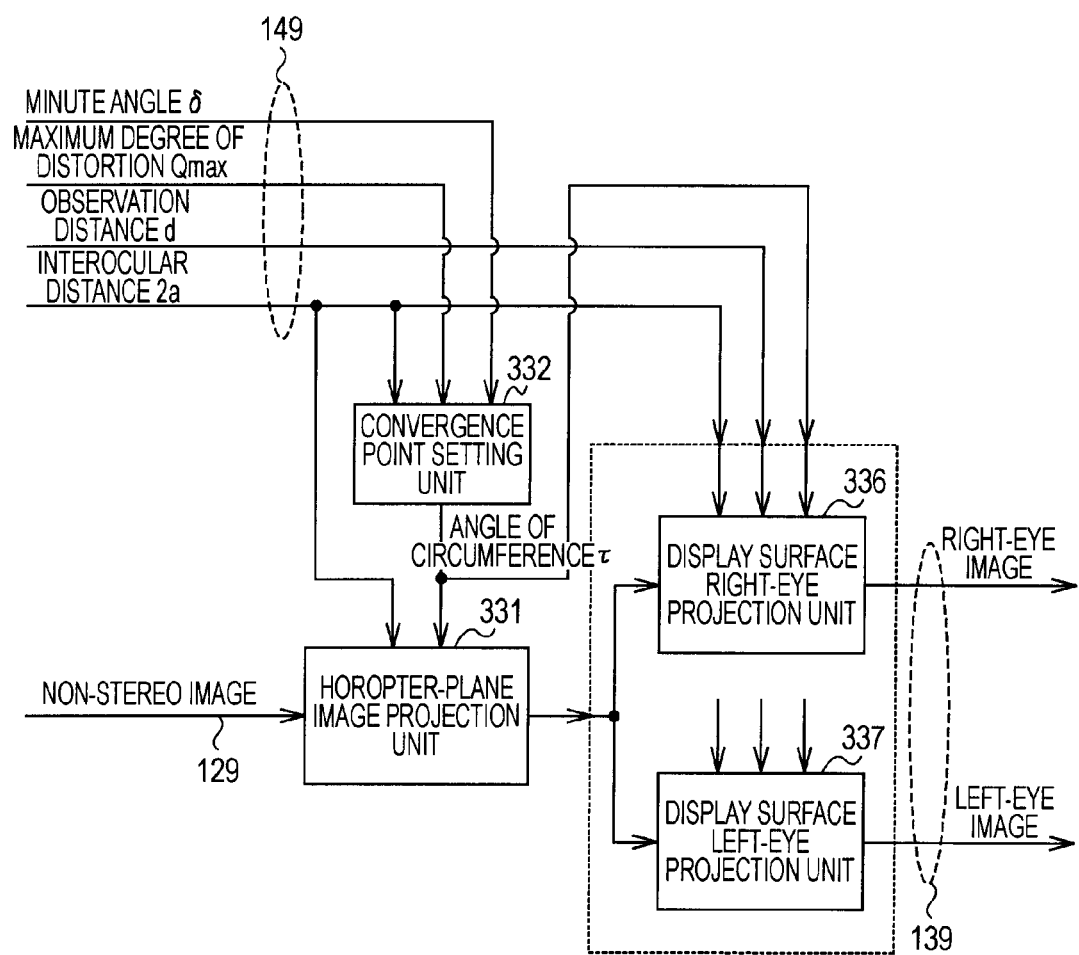
FIG. 12 is a diagram illustrating a third example of the three-dimensional conversion unit 130 in the embodiment of the present invention.

FIG. 12 is a diagram illustrating a third example of the three-dimensional conversion unit 130 in the embodiment of the present invention. This third example of the three-dimensional conversion unit 130 is designed to determine the point of convergence so as to suppress an increase in the degree of distortion of an image on a display surface. The greater the deviation from the exact front of each of two eyes, the greater the degree of distortion between the center and margins of the image. Thus, the point of convergence is set so that this degree of distortion can fall within an acceptable range. This third example of the three-dimensional conversion unit 130 includes a horopter-plane image projection unit 331, a convergence point setting unit 332, a display surface right-eye projection unit 336, and a display surface left-eye projection unit 337.

Like the horopter-plane image projection unit 311, the horopter-plane image projection unit 331 is designed to project the non-stereo image supplied from the signal processing unit 120 via the signal line 129 onto a cylindrical plane including a horopter circle. In this third example, the horopter circle is specified using an angle of circumference "τ" that is based on a point of convergence set by the convergence point setting unit 332. Note that the horopter-plane image projection unit 331 is an example of the cylindrical plane projection unit described in CLAIMS.

The convergence point setting unit 332 is designed to set a point of convergence and to supply an angle of circumference "τ" that is based on this point of convergence. The convergence point setting unit 332 sets a point of convergence using the interocular distance "2a", the observation distance "d", a maximum degree of distortion "Qmax", and a minute angle "δ". The details of the setting will be explained with reference to the following figure.

Similarly to the first example, the display surface right-eye projection unit 336 and the display surface left-eye projection unit 337 are designed to project the horopter image on the display surface for the right eye or the left eye. Note that although, here, the projection onto the display surface is performed using the angle of circumference "τ" supplied from the convergence point setting unit 332, the radius "r" in the first example and the angle of circumference "τ" in the present example are equivalent to each other in terms of setting a point of convergence. Therefore, both may be replaced with each other for use, as necessary. Note that the display surface right-eye projection unit 336 and the display surface left-eye projection unit 337 are examples of the display surface projection unit described in CLAIMS.

Figure 13:
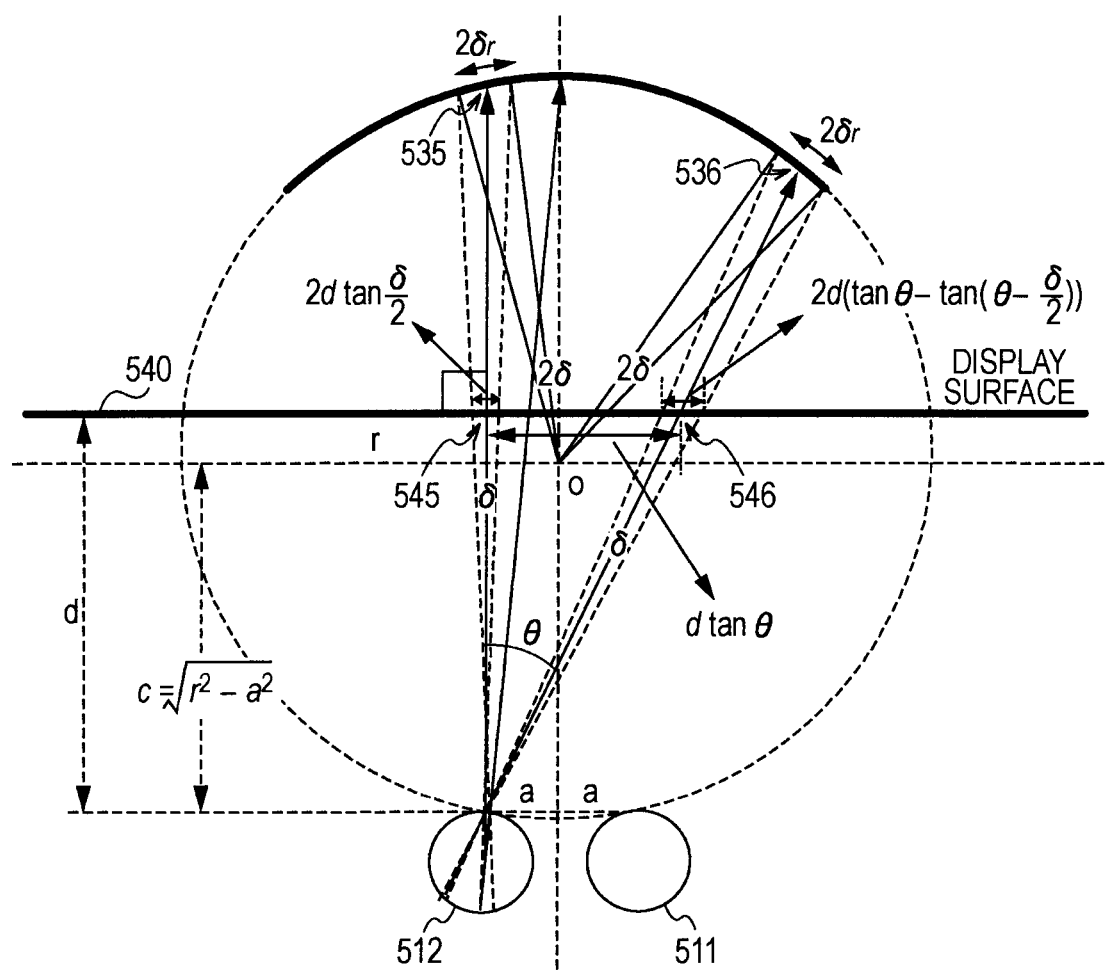
FIG. 13 is a diagram illustrating an example of the relationship between a horopter circle and the degree of distortion of an image.

FIG. 13 is a diagram illustrating an example of the relationship between a horopter circle and the degree of distortion of an image. While the degree of distortion is determined here for the left eye 512, similarity applies to the right eye 511.

Distances on the display surface 540 are compared in a case where a position 535 on the horopter circle, which is viewed in exactly front of the left eye 512, and a position 536 that is rotated by an angle θ with respect to this position are each deviated by a minute angle "δ". In a case where the position 535 is deviated by the minute angle "δ", the view angle of a center point o of the horopter circle is "2δ". Thus, a deviation of "2δr" occurs at the position 535 on the horopter circle. With this regard, in a case where the position 536 is deviated by the minute angle "δ", the view angle of the center point o of the horopter circle is also "2δ". Thus, similarly, a deviation of "2δr" occurs at the position 536 on the horopter circle.

At the position 545 on the display surface 540 which corresponds to the position 535 on the horopter circle, assuming a right triangle with sides each having the observation distance "d" and the angle "δ/2", a deviation width Q1 is expressed by the following equation:

$$Q1 = 2d\cdot\tan(\delta/2)$$

At the position 546 on the display surface 540 which corresponds to the position 536 on the horopter circle, on the other hand, assuming a right triangle with sides each having the observation distance "d" and the angle "θ", a deviation width Q2 is expressed by the following equation:

$$Q2 = 2d\cdot(\tan\theta - \tan(\theta - \delta6/2))$$

Therefore, the degree of distortion Q is obtained by the following equation:

$$Q = Q2/Q1$$
$$= (2d \cdot (\tan\theta - \tan(\theta - \delta/2)))/(2d \cdot \tan(\delta/2))$$
$$= (\tan\theta - \tan(\theta - \delta/2))/\tan(\delta/2)$$

Figure 14:
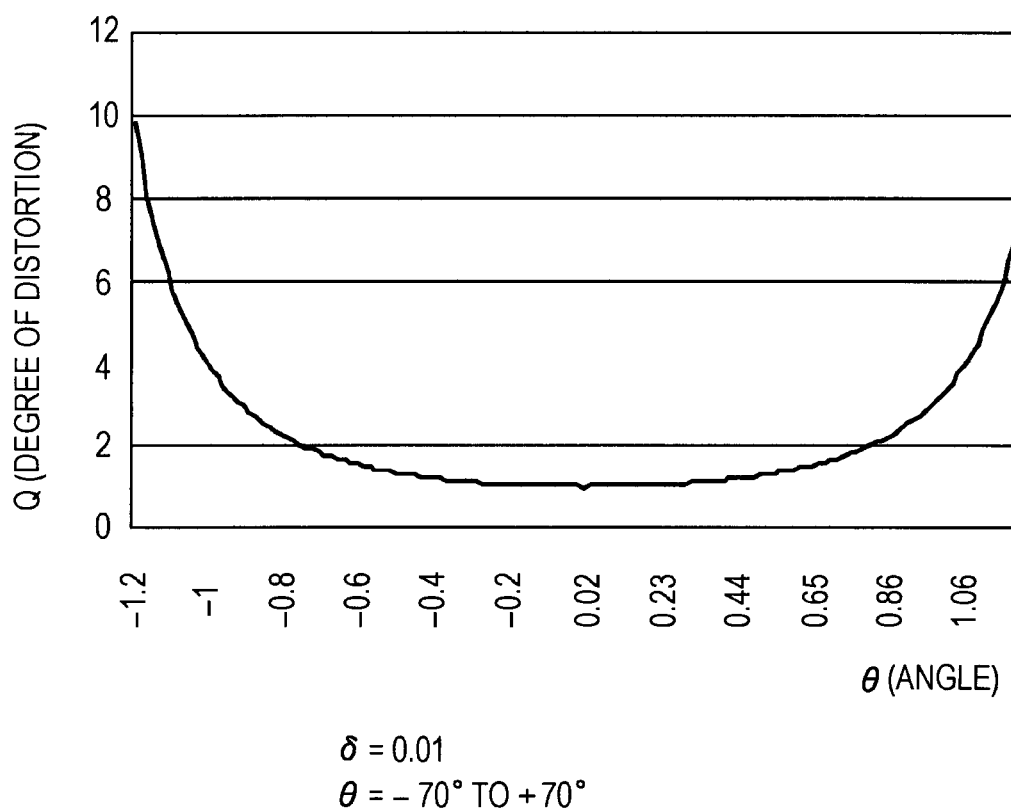
FIG. 14 is a diagram illustrating an example of the relationship between the angle $\theta$ and the degree of distortion Q of an image.

FIG. 14 is a diagram illustrating an example of the relationship between the angle θ and the degree of distortion Q of the image. Here, the degree of distortion Q obtained in a case where, in FIG. 13, the minute angle δ is set to "0.01" and the angle θ is changed from "−70°" to "+70°".

As can also be seen from this example, the greater the deviation from the exact front of the eyes, the greater the degree of distortion Q between the center and margins of the image. In this third example, therefore, a maximum degree of distortion "Qmax" is given as a threshold of the degree of distortion, and the angle θ is set so that the degree of distortion becomes smaller than the threshold.

FIG. 15 is a diagram illustrating an example of the relationship between the horopter circle and the angle of circumference. If it is assumed that the angle of circumference is "τ", then the angle at which the center point o of the horopter circle 520 is viewed from the right eye 511 and the left eye 512 is "2τ". This angle is equally divided into two parts by the perpendicular from the center point o to the center of the two eyes, each yielding "τ". In this figure, "τ" with reference to the left eye 512 is illustrated.

Focusing on a triangle defined by an intersection 537 of the center line between the right eye 511 and the left eye 512 and the horopter circle 520, the left eye 512, and the center point o of the horopter circle 520, both the angles at the intersection 537 and the left eye 512 are "τ/2". Since the line connecting the position 535 on the horopter circle, which is viewed in exactly front of the left eye 512, and the left eye 512 is parallel to the center line between the right eye 511 and the left eye 512, the angle formed at the left eye 512 by the intersection 537 and an end point 538 of the input image is expressed by "θ−τ/2". In this regard, the angle θ is an angle formed at the left eye 512 by the position 535 and the end point 538 of the input image. Therefore, the angle at which the center point o of the horopter circle 520 is viewed from the intersection 537 and the end point 538 of the input image is expressed by "2·(θ−τ/2)". In this case, the length of a circular arc matches the size (width) of the input image, "L". Thus, the following equation holds true:

$$2 \cdot (\theta - \tau/2) \cdot r = L$$

Additionally, focusing on a right triangle defined by a center point between the right eye 511 and the left eye 512, the center point o of the horopter circle 520, and the left eye 512, the radius r is represented by the equation below. That is, it is understood that the radius "r" can be determined using the angle of circumference "τ" and the interocular distance "2a".

$$r = a/\sin(\tau)$$

Therefore, removing the radius r from the above two equations yields the following equation:

$$2 \cdot (\theta - \tau/2) \cdot (a/\sin(\tau)) = L$$

It is understood from the above equation that if the angle "θ", the half of the interocular distance, "a", and the size "L" of the input image are known, the angle of circumference "τ" can be obtained.

In this manner, in the third example of the three-dimensional conversion unit 130 in the embodiment of the present invention, by giving the minute angle "δ" and the maximum degree of distortion "Qmax", the point of convergence can be set so that the distortion between the center and margins of the screen can be made equal to or less than the maximum degree of distortion, and the horopter circle can be specified.

Figure 16:
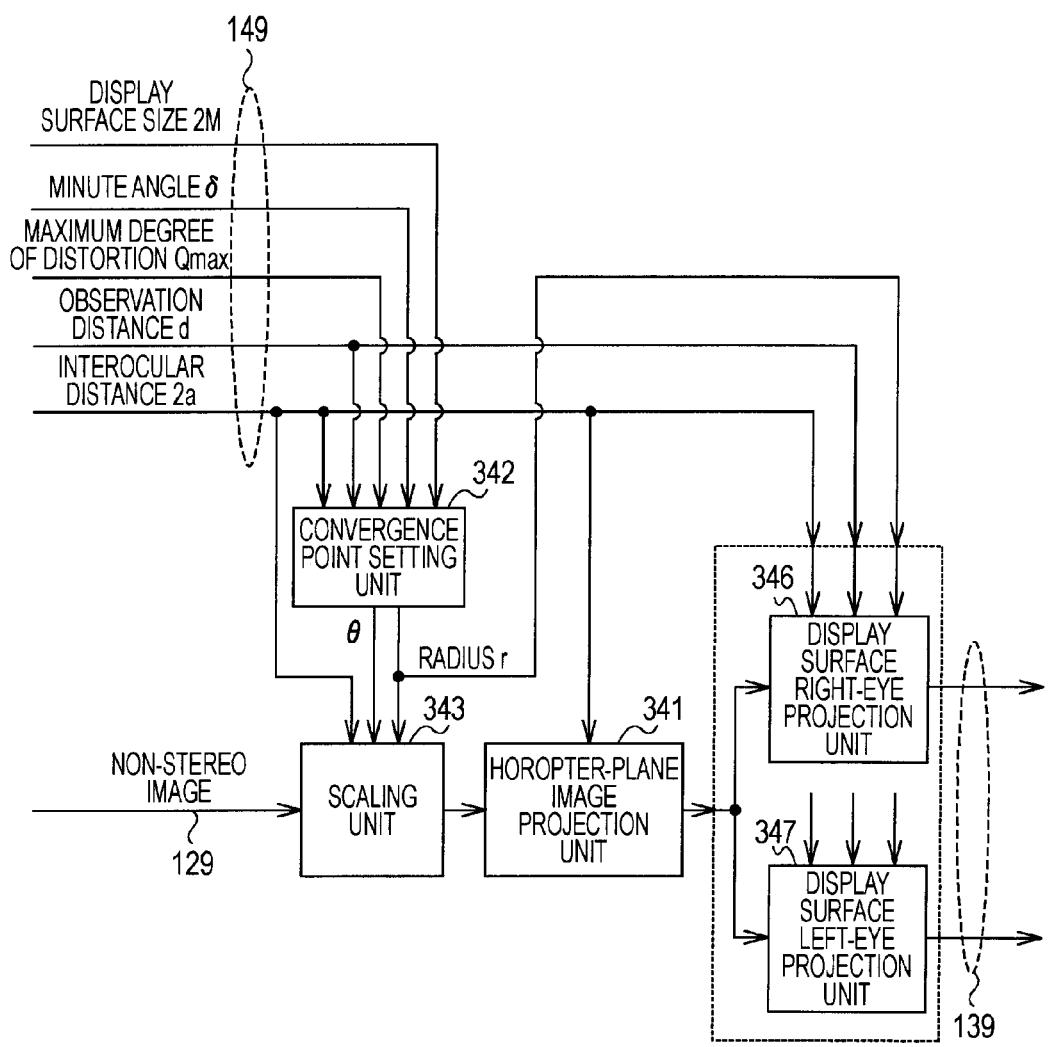
FIG. 16 is a diagram illustrating a fourth example of the three-dimensional conversion unit 130 in the embodiment of the present invention.

FIG. 16 is a diagram illustrating a fourth example of the three-dimensional conversion unit 130 in the embodiment of the present invention. This fourth example of the three-dimensional conversion unit 130 is designed to determine a point of convergence so as to suppress an increase in the distortion of an image on a display surface and to scale up or down the size (width) of an input image so that the input image can be displayed on the entirety of the display surface. This fourth example of the three-dimensional conversion unit 130 includes a horopter-plane image projection unit 341, a convergence point setting unit 342, a scaling unit 343, a display surface right-eye projection unit 346, and a display surface left-eye projection unit 347.

The convergence point setting unit 342 is designed to set a point of convergence and to supply a radius "r" that is based on this point of convergence and an angle "θ". The convergence point setting unit 342 sets a point of convergence using the interocular distance "2a", the observation distance "d", the maximum degree of distortion "Qmax", the minute angle "δ", and the display surface size "2M".

The scaling unit 343 is designed to enlarge or reduce (scale up or down) the non-stereo image supplied from the signal processing unit 120 via the signal line 129 in accordance with the point of convergence set by the convergence point setting unit 342.

The horopter-plane image projection unit 341 is designed to project the non-stereo image scaled up or down by the scaling unit 343 onto a cylindrical plane including a horopter circle. Note that the horopter-plane image projection unit 341 is an example of the cylindrical plane projection unit described in CLAIMS.

Similarly to the first example, the display surface right-eye projection unit 346 and the display surface left-eye projection unit 347 are designed to project the horopter image on the display surface for the right eye or the left eye. Note that the display surface right-eye projection unit 346 and the display surface left-eye projection unit 347 are examples of the display surface projection unit described in CLAIMS.

Figure 17:
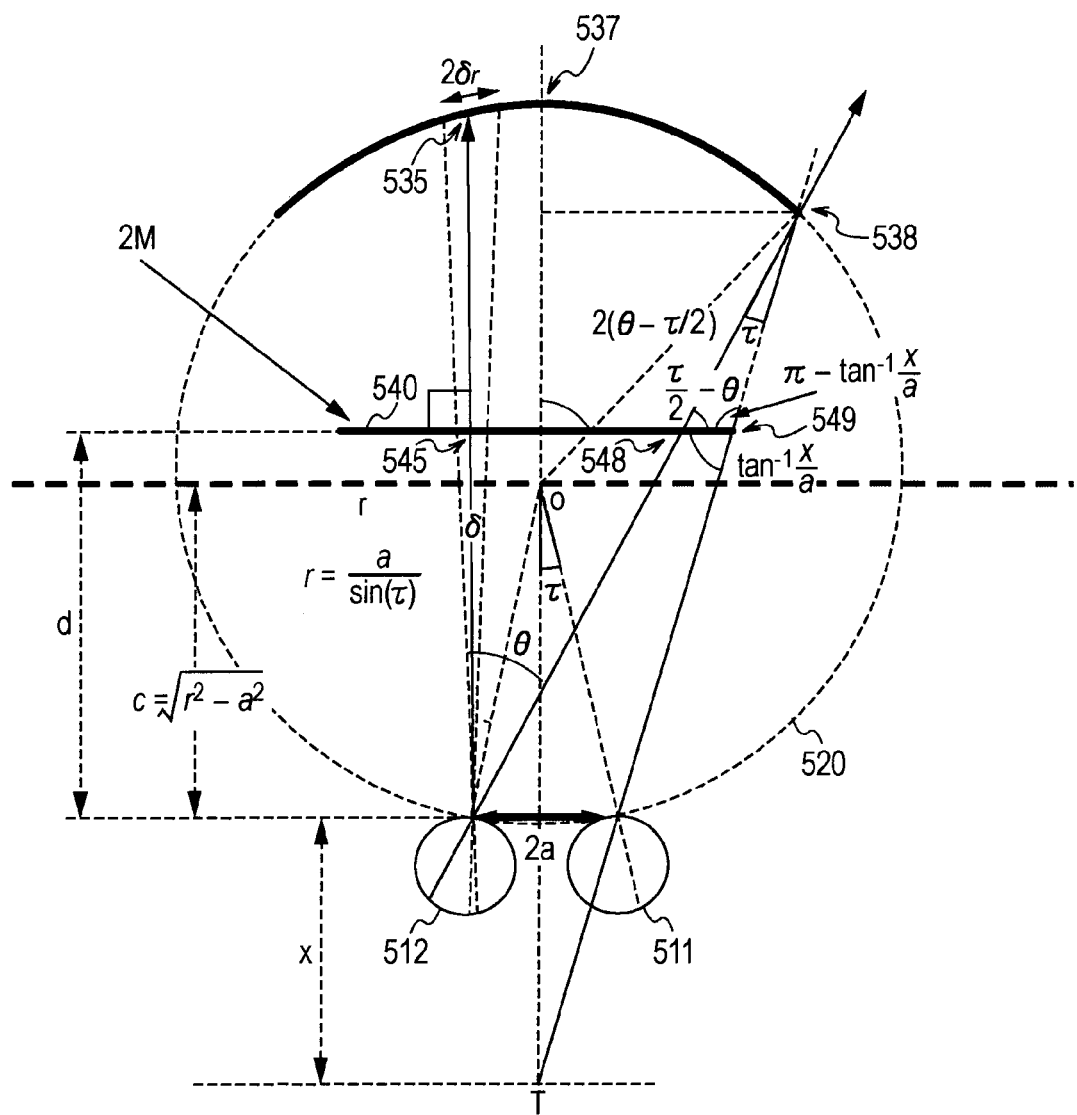
FIG. 17 is a diagram illustrating an example of the relationship between a horopter circle and a display surface.

FIG. 17 is a diagram illustrating an example of the relationship between the horopter circle and the display surface. In this fourth example, similarly to the third example, the angle "θ" is determined so that the degree of distortion with respect to the minute angle "ι" can be made smaller than the maximum degree of distortion "Qmax". Then, based on the angle "θ", the horopter circle is determined and, in addition, the size of the input image is determined.

Since the end point 538 of the input image is located on the horopter circle 520, the angle at which the end point 538 of the input image is viewed from the right eye 511 and the left eye 512 is "τ". Additionally, focusing on a right triangle defined by an intersection 548 between a line connecting the left eye 512 and the end point 538 of the input image and the display surface 540, an intersection 545 between a line connecting the left eye 512 and a point 535 located in exactly front of the left eye and the display surface 540, and the position of the left eye 512, the angle defined at the intersection 548 from the left eye 512 is expressed by "π/2−θ". Additionally, focusing on a right triangle including a vertex T, the angle defined at the intersection 549 from the vertex T is "$\tan^{-1}(x/a)$".

Here, x satisfies the following relationship $$x:a=(x+d):M$$

and is therefore given by:

$$x=a\cdot d/(M-a)$$

Therefore, an inner angle at the intersection 549 is expressed by "π−tan$^{-1}$(x/a)". Accordingly, the angle "τ" is given by the equation below. That is, the horopter circle is determined by setting τ so that the following equation holds true:

$$\tau=\theta-(\pi/2)+\tan^{-1}(x/a)$$

Additionally, as calculated in the third example, the angle at which the center point o of the horopter circle 520 is viewed from the intersection 537 and the end point 538 of the input image is expressed by "2·(θ−τ/2)". In this case, the length of a circular arc matches the size (width) of the input image, "L". Thus, the following equation holds true:

$$L=2\cdot(\theta-\tau/2)\cdot r$$

In the third example, the size of the input image is fixed whereas in this fourth example, the size of the input image is variable, and the input image is scaled up or down by the scaling unit 343 so as to meet the above equation.

In this manner, in the fourth example of the three-dimensional conversion unit 130 in the embodiment of the present invention, the point of convergence can be set so that the distortion between the center and margins of the screen can be made equal to or less than the maximum degree of distortion, and the horopter circle can be specified. In addition, the input image can be scaled up or down so that the input image can be displayed on the entirety of the display surface.

Figure 18:
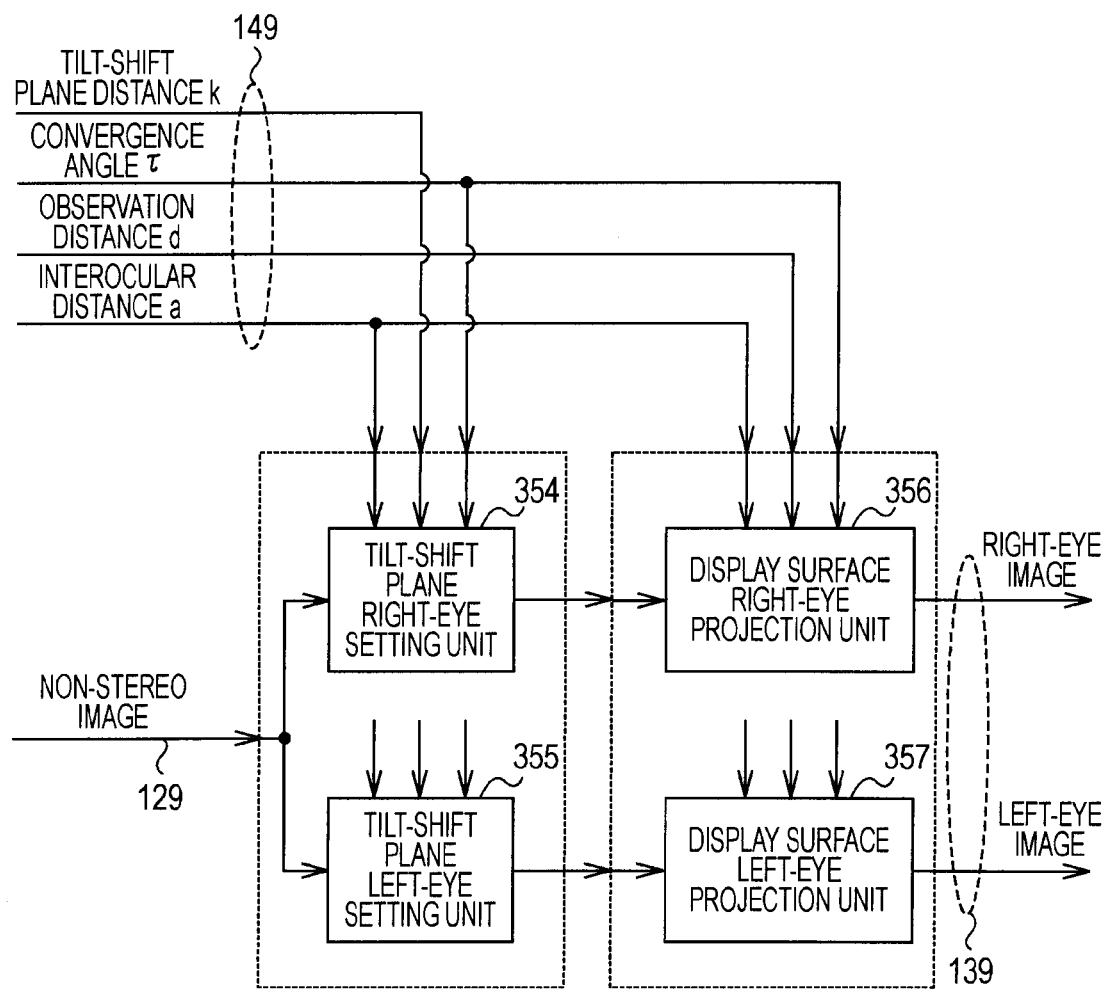
FIG. 18 is a diagram illustrating a fifth example of the three-dimensional conversion unit 130 in the embodiment of the present invention.

FIG. 18 is a diagram illustrating a fifth example of the three-dimensional conversion unit 130 in the embodiment of the present invention. This fifth example of the three-dimensional conversion unit 130 is designed to generate a stereo image by projecting a non-stereo image onto tilt-shift planes corresponding to the respective eyes and thereafter projecting resulting images onto a display surface without performing the procedure of projecting the non-stereo image onto a horopter circle. In this regard, as illustrated below, an image displayed according to this fifth example is equivalent to an image displayed through the horopter circle explained with respect to the first to fourth examples. Therefore, it is assumed here that, in order to generate a stereo image, a horopter circle is assumed and the radius of this horopter circle is given as a parameter. This fifth example of the three-dimensional conversion unit 130 includes a tilt-shift plane right-eye setting unit 354, a tilt-shift plane left-eye setting unit 355, a display surface right-eye projection unit 356, and a display surface left-eye projection unit 357.

The tilt-shift plane right-eye setting unit 354 is designed to set, assuming the extension of a visual point in which a point of convergence equidistant from two eyes is viewed from the right eye, a tilt-shift plane that perpendicularly intersects this extension of the visual point and to project the non-stereo image supplied from the signal processing unit 120 via the signal line 129 as a tilt-shift image for the right eye. The tilt-shift plane left-eye setting unit 355 is designed to set, assuming the extension of a visual point in which the point of convergence equidistant from the two eyes is viewed from the left eye, a tilt-shift plane that perpendicularly intersects this extension of the visual point and to project the non-stereo image supplied from the signal processing unit 120 via the signal line 129 as a tilt-shift image for the left eye. The tilt-shift plane right-eye setting unit 354 and the tilt-shift plane left-eye setting unit 355 perform projection onto the tilt-shift planes for the right and left eyes on the basis of the interocular distance "2a", the radius "r" of the horopter circle, the assumed observation distance "d", and a tilt-shift plane distance "k". Note that each of the tilt-shift planes is an example of the irradiation plane described in CLAIMS. Additionally, the tilt-shift plane right-eye setting unit 354 and the tilt-shift plane left-eye setting unit 355 are examples of the irradiation-plane projection unit described in CLAIMS.

The display surface right-eye projection unit 356 is designed to project the tilt-shift image for the right eye onto a display surface for the right eye. The display surface left-eye projection unit 357 is designed to project the tilt-shift image for the left eye onto a display surface for the left eye. The display surface right-eye projection unit 356 and the display surface left-eye projection unit 357 perform projection onto the display surfaces for the right and left eyes on the basis of the interocular distance "2a", the radius "r" of the horopter circle, and the assumed observation distance "d". An image projected onto the display surface for the right eye is referred to as a right-eye image, and an image projected onto the display surface for the left eye is referred to as a left-eye image. The right-eye and left-eye images are supplied to the post-processing unit 160 via the signal line 139. Note that the display surface right-eye projection unit 356 and the display surface left-eye projection unit 357 are examples of the display surface projection unit described in CLAIMS.

Figure 19:
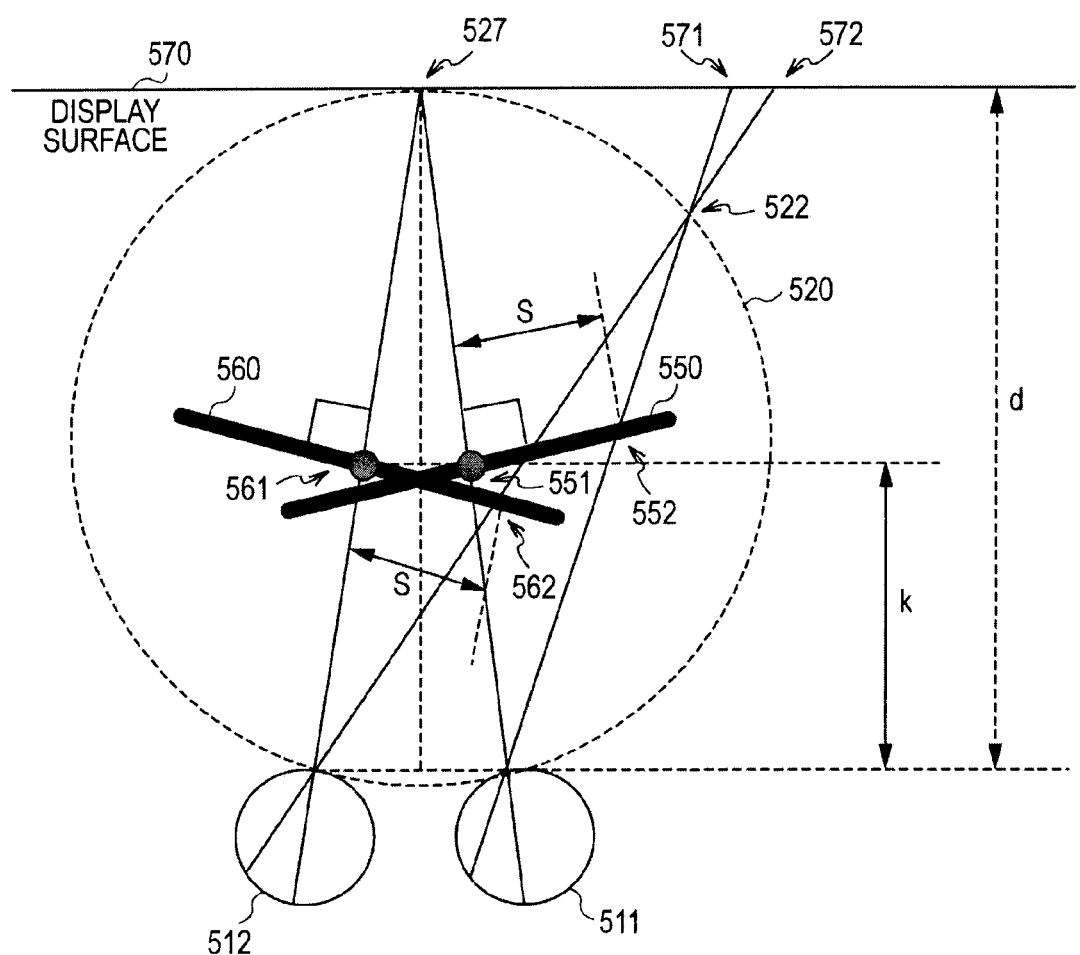
FIG. 19 is a diagram illustrating one form of the projection onto tilt-shift planes in the fifth example of the three-dimensional conversion unit 130 in the embodiment of the present invention.

FIG. 19 is a diagram illustrating one form of the projection onto the tilt-shift planes in the fifth example of the three-dimensional conversion unit 130 in the embodiment of the present invention.

The intersection of the center line between the right eye 511 and the left eye 512 and the horopter circle 520 is a point of convergence 527 that is equidistant from the two eyes. A right-eye tilt-shift plane 550 is a plane that perpendicularly intersects, at a point 551, the extension of a visual point in which the point of convergence 527 is viewed from the right eye 511. A left-eye tilt-shift plane 560 is a plane that perpendicularly intersects, at a point 561, the extension of a visual point in which the point of convergence 527 is viewed from the left eye 512. It is assumed that the distance between a line segment connecting the position of the right eye 511 and the position of the left eye 512 and a line segment connecting the points 551 and 561 is assumed to be a tilt-shift plane distance "k".

It is considered here that images on the right-eye tilt-shift plane 550 and the left-eye tilt-shift plane 560 are projected onto a display surface 570. It is assumed that the distance between the right and left eyes 511 and 512 and the display surface 570 is assumed to be an observation distance "d". An image formed at a point 552 that is distant by a distance "S" from the point 551 on the right-eye tilt-shift plane 550 is displayed at a display position 571 on the display surface 570. An image formed at a point 562 that is distant by the distance "S" from the point 561 on the left-eye tilt-shift plane 560 is displayed at a display position 572 on the display surface 570. At this time, a line connecting the right eye 511 and the point 571 and a line connecting the left eye 512 and the point 572 intersect each other at an intersection 522 on the horopter circle 520. That is, an image displayed according to this fifth example is equivalent to an image displayed through the horopter circle explained with respect to the first to fourth examples.

FIG. 20 is a diagram illustrating a specific example of the projection onto the tilt-shift planes in the fifth example of the three-dimensional conversion unit 130 in the embodiment of the present invention.

Part (a) of FIG. 20 illustrates the coordinate system of an input image I(p, q) supplied from the signal processing unit 120 via the signal line 129. Since the input image is a non-stereo image, the two-dimensional coordinate system is used. The origin of the coordinate system is set to the center point of the input image. Additionally, the input image size (width) is assumed to be "2L".

Part (b) of FIG. 20 illustrates the coordinate system of the tilt-shift planes on which tilt-shift images are projected. Since the tilt-shift planes are three-dimensional, the three-dimensional (x, y, z) coordinate system is used here. The origin of the coordinate system is set to the center between the right eye 511 and the left eye 512. Part (b) of FIG. 20 is a figure viewed from a direction perpendicular to the tilt-shift planes, that is, a direction perpendicular to the y axis.

If it is assumed that the angle at which a point of convergence on the horopter circle 520 is viewed from the right eye 511 and the left eye 512 is a convergence angle "$\tau$", each of the right-eye tilt-shift plane 550 and the left-eye tilt-shift plane 560 has an angle of "$\tau/2$" from the horizon.

Focusing on an intersection 582 that is dropped perpendicularly to the line connecting the two eyes from the point 561 on the left-eye tilt-shift plane 560, the distance between the left eye 512 and the intersection 582 is expressed by "$k \cdot \tan(\tau/2)$". Therefore, the distance between a point 589 at a position that is distant by the tilt-shift plane distance "$k$" from the origin along the z axis and the point 561 on the left-eye tilt-shift plane 560 is expressed by "$a - k \cdot \tan(\tau/2)$". Therefore, the relationship between the left-eye tilt-shift image L(x, y, z) on the left-eye tilt-shift plane 560 and the input image I(p, q) is represented by the following equation:

$$L(x,y,z) = I((x + a - k \cdot \tan(\tau/2))/(\cos(\tau/2)), y)$$

where, in this left-eye tilt-shift image L(x, y, z), the following is true:

$$z = k - ((x + a - k \cdot \tan(\tau/2))/\sin(\tau/2))$$

Additionally, similarly, the relationship between the right-eye tilt-shift image R(x, y, z) on the right-eye tilt-shift plane 550 and the input image I(p, q) is represented by the following equation:

$$R(x,y,z) = I((x - a + k \cdot \tan(\tau/2))/(\cos(\tau/2)), y)$$

where, in this right-eye tilt-shift image R(x, y, z), the following is true:

$$z = k + ((x - a + k \cdot \tan(\tau/2))/\sin(\tau/2))$$

FIG. 21 is a diagram illustrating a specific example of the projection onto the display surface in the fifth example of the three-dimensional conversion unit 130 in the embodiment of the present invention.

Part (a) of FIG. 21 illustrates the coordinate system of the tilt-shift planes and the display surface. Here, the three-dimensional (x, y, z) coordinate system is used.

Part (b) of FIG. 21 illustrates the coordinate system of a display image J(s, t) projected on the display surface. Display images are respectively obtained for the right eye 511 and the left eye 512. Since each image is a two-dimensional image, the two-dimensional coordinate system is used. The origin of the coordinate system is set to the center point of the display image.

At this time, $D_L(x_L, x_L, z_L)$ on the display surface 570, which is projected from the left eye 512 through $L(x_0, y_0, z_0)$ on the left-eye tilt-shift image is given by the following equation:

$$D_L(x_L, y_L, z_L) = J(x_L, y_L) = L(x_0, y_0, z_0)$$

Additionally, since the distance from the observation position of the viewer is equal to the observation distance d, $z_R = d$ is obtained and the following expressions hold true:

$$(x_0 + a)/(x_L + a) = y_0/y_L = z_0/d$$

$$z_0 > 0$$

In this regard, as explained using FIG. 20, the following expression holds true:

$$z_0 = k - ((x_0 + a - k \cdot \tan(\tau/2))/\sin(\tau/2))$$

Note that while $D_L(x_L, y_L, z_L)$, which is projected from the left eye 512, has been explained here, $D_R(x_R, y_R, z_R)$ on the display surface 570, which is projected from the right eye 511 through $R(x_0, y_0, z_0)$ on the right-eye tilt-shift image, can also be determined in a similar manner.

Figure 22:
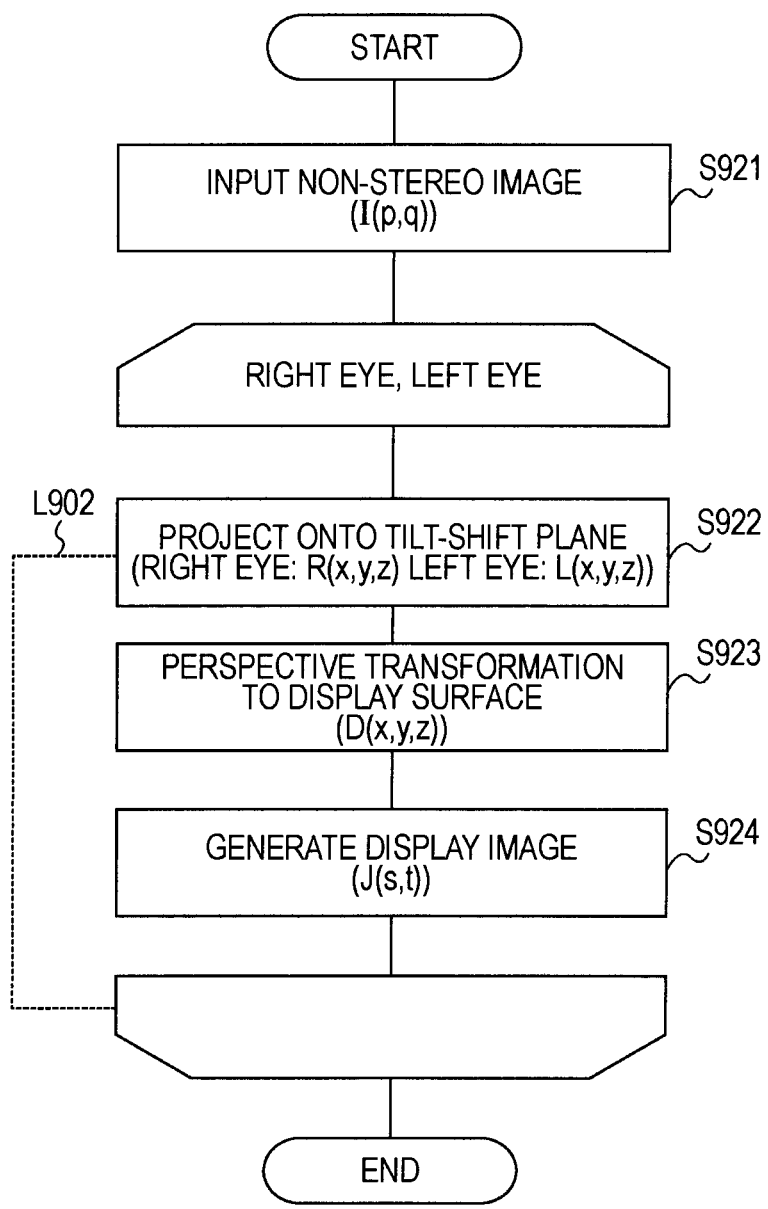
FIG. 22 is a diagram illustrating an exemplary processing procedure performed by the fifth example of the three-dimensional conversion unit 130 in the embodiment of the present invention.

FIG. 22 is a diagram illustrating an exemplary processing procedure performed by the fifth example of the three-dimensional conversion unit 130 in the embodiment of the present invention.

First, when an input image I(p, q) is input from the signal processing unit 120 via the signal line 129 (step S921), the input image I(p, q) is respectively projected as tilt-shift images. In this regard, unlike the first example, separate tilt-shift planes are provided for the right eye and the left eye, and display images are generated in the following manner (loop L902).

When the input image I(p, q) is projected as a right-eye tilt-shift image R(x, y, z) on the right-eye tilt-shift plane 550 (step S922), perspective transformation is performed for the display surface 570, and three-dimensional $D_R(x_R, y_R, z_R)$ is obtained (step S923). Then, a two-dimensional display image $J(x_R, y_R)$ on the display surface is obtained from this three-dimensional position (step S924). Similarly, when the input image I(p, q) is projected as a left-eye tilt-shift image L(x, y, z) on the left-eye tilt-shift plane 550 (step S922), perspective transformation is performed for the display surface 570, and three-dimensional $D_L(x_L, y_L, z_L)$ is obtained (step S923). Then, a two-dimensional display image $J(x_L, y_L)$ on the display surface is obtained from this three-dimensional position (step S924). Note that step S922 is an example of the irradiation-plane projecting procedure described in CLAIMS. Additionally, steps S923 and S924 are examples of the display-surface projecting procedure described in CLAIMS.

In this manner, in the fifth example of the three-dimensional conversion unit 130 in the embodiment of the present invention, a non-stereo image is projected as right-eye and left-eye tilt-shift images onto right-eye and left-eye tilt-shift planes, respectively. Then, the right-eye and left-eye tilt-shift images are projected onto a display surface located at an actually measured or estimated observation distance. Therefore, a stereo image for the right eye 511 and the left eye 512 can be generated.

Figure 23:
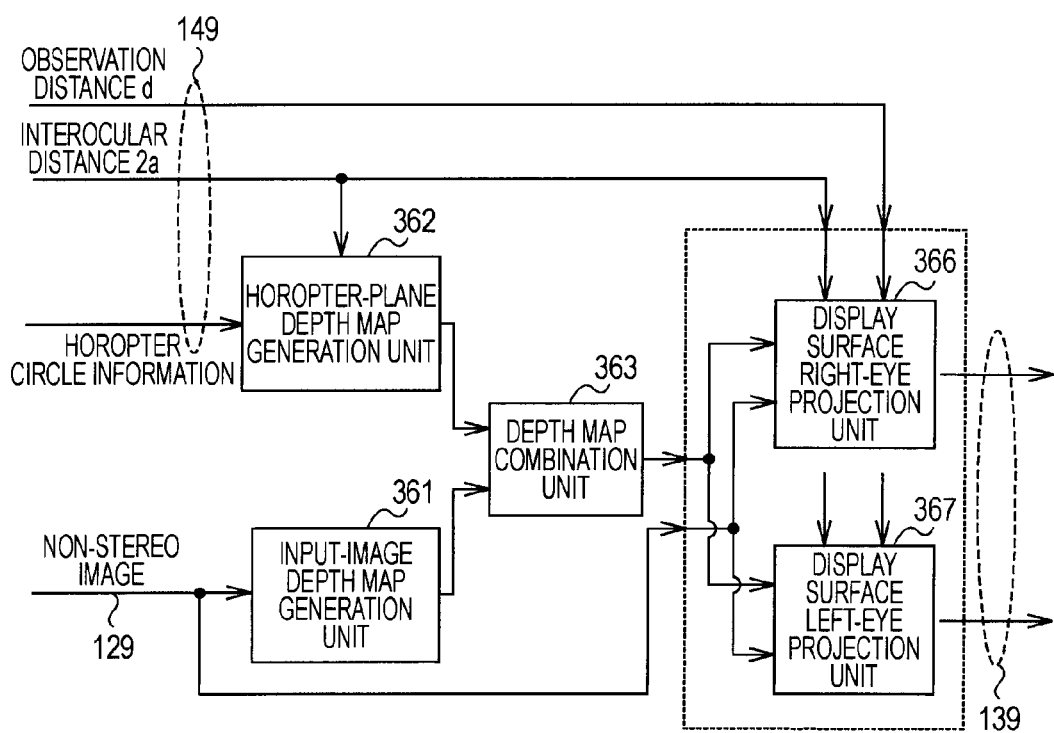
FIG. 23 is a diagram illustrating a sixth example of the three-dimensional conversion unit 130 in the embodiment of the present invention.

FIG. 23 is a diagram illustrating a sixth example of the three-dimensional conversion unit 130 in the embodiment of the present invention. This sixth example is designed to generate a stereo image in accordance with a depth map that is based on degree-of-depth information. This sixth example of the three-dimensional conversion unit 130 includes an input-image depth map generation unit 361, a horopter-plane depth map generation unit 362, a depth map combination unit 363, a display surface right-eye projection unit 366, and a display surface left-eye projection unit 367.

The input-image depth map generation unit 361 is designed to generate a depth map for the non-stereo image (input image) supplied from the signal processing unit 120 via the signal line 129. A depth map is designed to hold information regarding the degree of depth for each pixel, and is estimated on the basis of, for example, the luminance, high-frequency component, motion, saturation, and the like. For example, Japanese Unexamined Patent Application Publication No. 2007-502454 describes a multi-view image generation unit that generates a depth map on the basis of edges detected in an input image. Note that the input-image depth map generation unit 361 is an example of the degree-of-depth information generation unit described in CLAIMS.

The horopter-plane depth map generation unit 362 is designed to generate a depth map for the horopter plane. Similarly to the first example, the horopter plane is such that the size of the horopter circle is specified by horopter circle information, and the relative positional relationship with two eyes is specified by the interocular distance "2a".

The depth map combination unit 363 is designed to combine the depth map of the input image that is generated by the input-image depth map generation unit 361 with the depth map of the horopter plane that is generated by the horopter-plane depth map generation unit 362. Note that the depth map combination unit 363 is an example of the degree-of-depth information combination unit described in CLAIMS.

The display surface right-eye projection unit 366 is designed to, for the non-stereo image supplied from the signal processing unit 120 via the signal line 129, project a stereo image for the right eye onto the display surface for the right eye by taking a combined depth map obtained by the depth map combination unit 363 into consideration. Additionally, the display surface left-eye projection unit 367 is designed to, for the non-stereo image supplied from the signal processing unit 120 via the signal line 129, project a stereo image for the left eye onto the display surface for the left eye by taking the combined depth map obtained by the depth map combination unit 363 into consideration.

Figure 24:
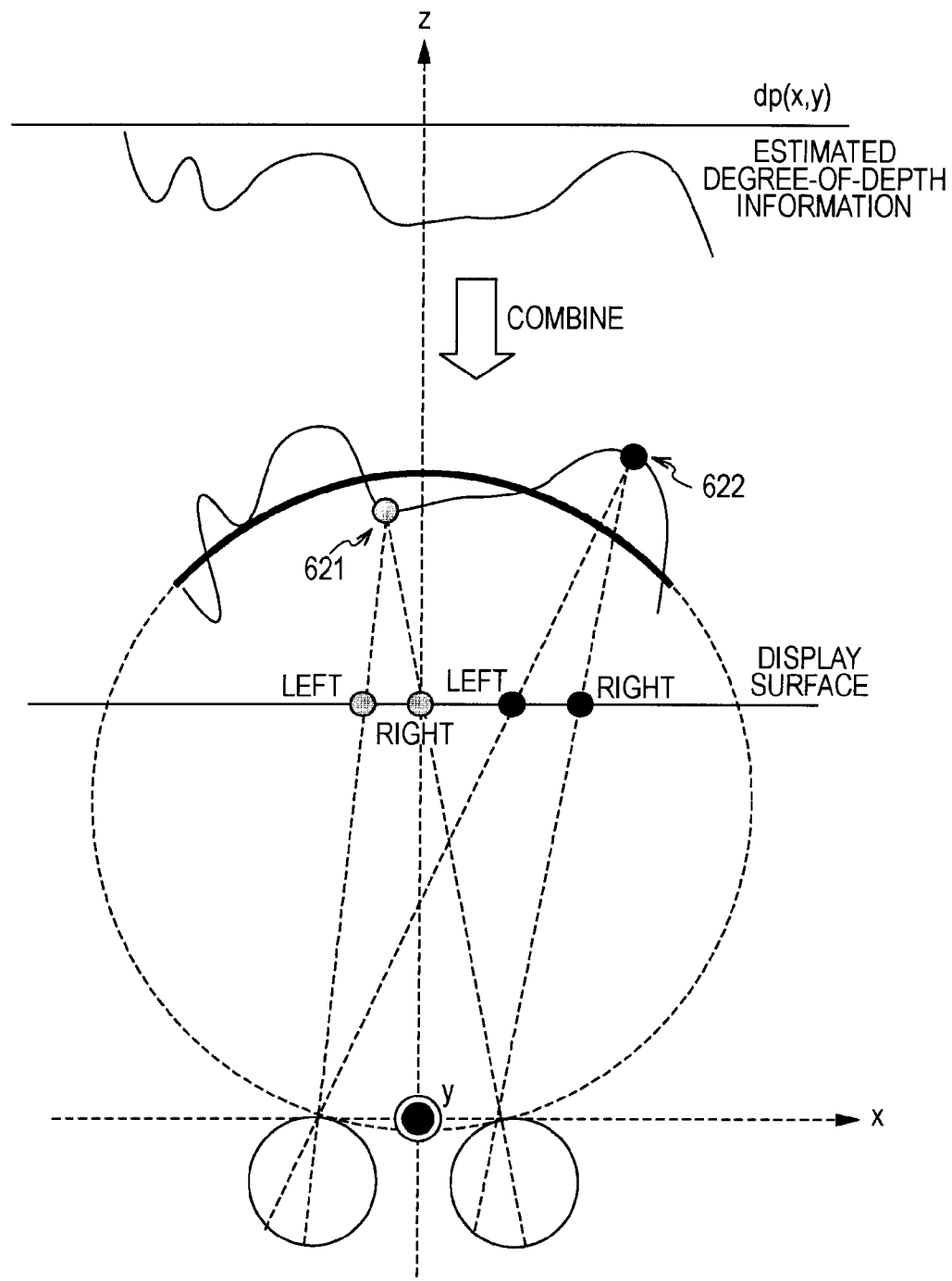
FIG. 24 is a diagram illustrating an overview of a process performed by the sixth example of the three-dimensional conversion unit 130 in the embodiment of the present invention.

FIG. 24 is a diagram illustrating an overview of a process performed by the sixth example of the three-dimensional conversion unit 130 in the embodiment of the present invention.

In this sixth example, degree-of-depth information is estimated by the input-image depth map generation unit 361, and is combined with the horopter plane. Thus, in addition to the feeling of depth using the nature of the horopter circle explained previously, the stereoscopic feeling can further be enhanced by further adding degree-of-depth information corresponding to the three-dimensional structure of a scene.

For example, since a point 621 after combination is located in front of the horopter circle, a projection thereof onto the display surface is perceived as being located at a closer position. Additionally, since a point 622 after combination is located behind the horopter circle, a projection thereof onto the display surface is perceived as being located at a farther position.

Figure 25:
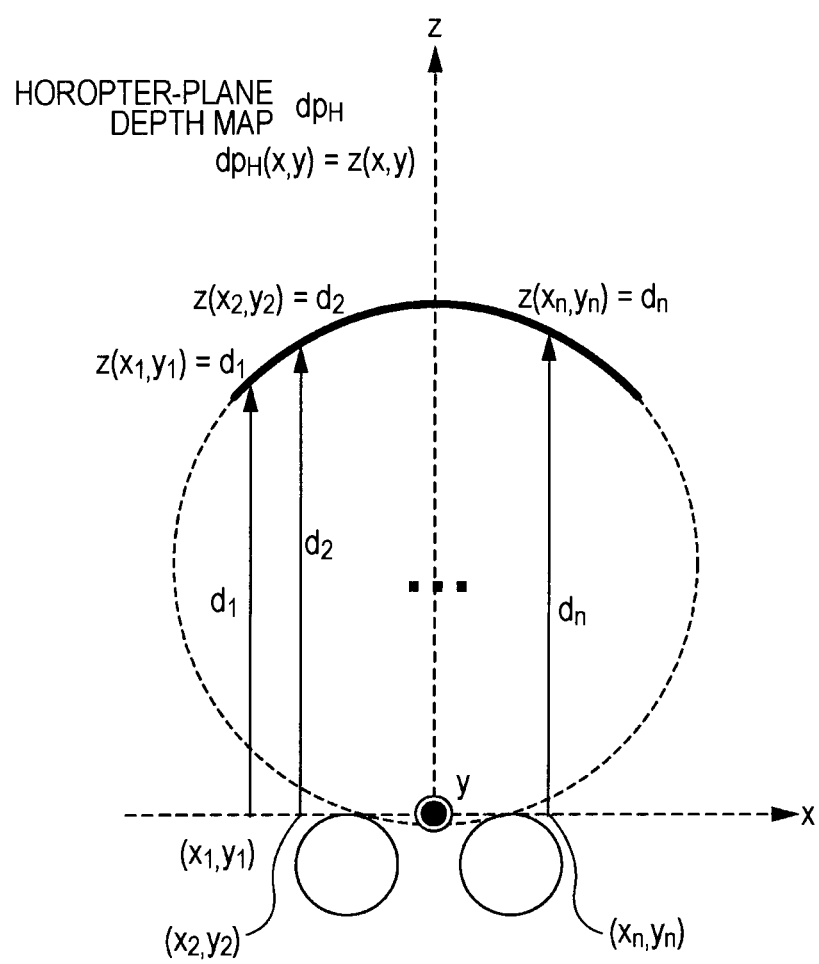
FIG. 25 is a diagram illustrating an example of a depth map of a horopter plane according to the sixth example of the three-dimensional conversion unit 130 in the embodiment of the present invention.

FIG. 25 is a diagram illustrating an example of a depth map of the horopter plane according to the sixth example of the three-dimensional conversion unit 130 in the embodiment of the present invention.

Here, the depth map of the horopter plane is represented by $dp_H$. The horopter plane has a three-dimensional shape including a horopter circle, and is specified by the distance from the x plane. That is, the depth map of the horopter plane is a function of x and y, and is represented by the following equation:

$$dp_H(x,y)=z(x,y)$$

At this time, if it is assumed that the distance of the horopter plane from the x plane with respect to coordinates $(x_i, y_i)$ is $d_i$, then the function $z(x, y)$ is given by the following equation:

$$z(x_i,y_i)=d_i \ (i=1,2,\ldots,n)$$

Figure 26:
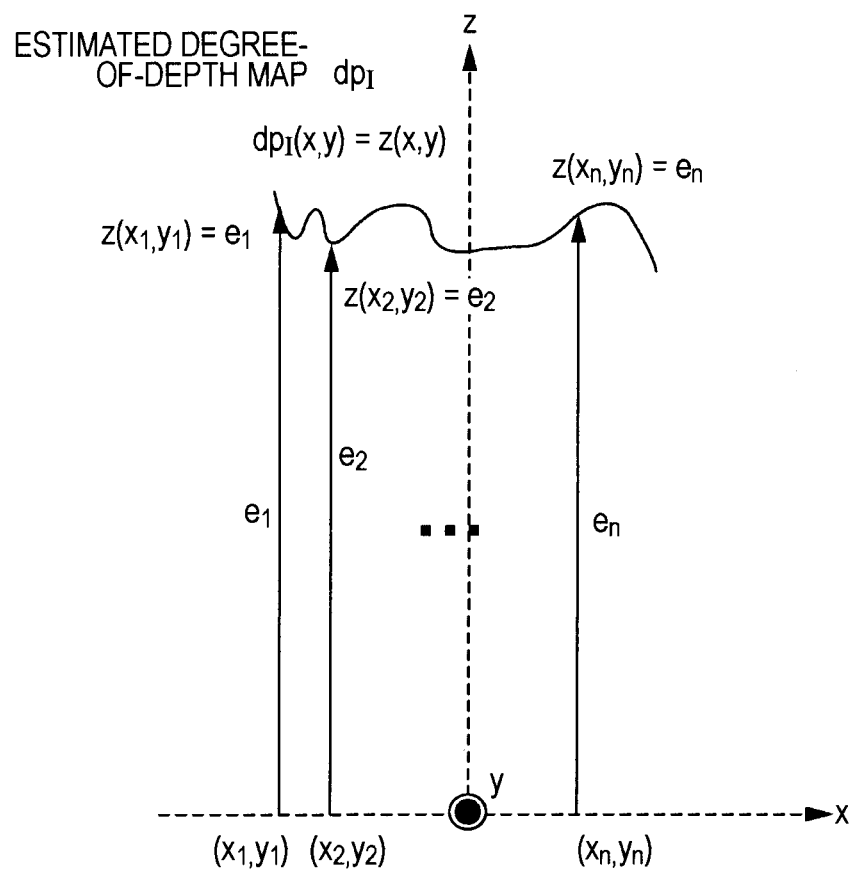
FIG. 26 is a diagram illustrating an example of degree-of-depth information that is estimated by the sixth example of the three-dimensional conversion unit 130 in the embodiment of the present invention.

FIG. 26 is a diagram illustrating an example of degree-of-depth information that is estimated by the sixth example of the three-dimensional conversion unit 130 in the embodiment of the present invention.

Here, the depth map of the degree-of-depth information is represented by $dp_I$. The degree-of-depth information is designed to indicate the degree of depth corresponding to each pixel, and is represented as three-dimensional information. That is, the depth map of the degree-of-depth information is a function of x and y, and is represented by the following equation:

$$dp_I(x,y)=z(x,y)$$

At this time, if it is assumed that the degree-of-depth information from the x plane with respect to coordinates $(x_i, y_i)$ has value $e_i$, the function $z(x, y)$ is given by the following equation:

$$z(x_i,y_i)=e_i \ (i=1,2,\ldots,n)$$

Figure 27:
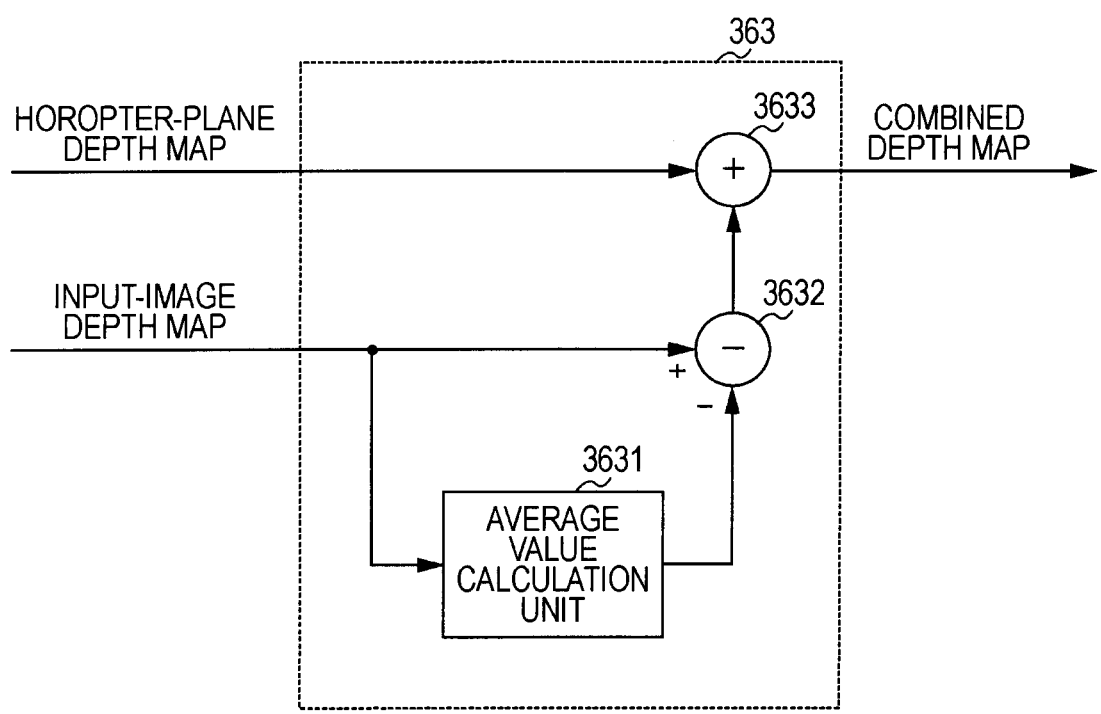
FIG. 27 is a diagram illustrating an example configuration of a depth map combination unit 363 in the sixth example of the three-dimensional conversion unit 130 in the embodiment of the present invention.

FIG. 27 is a diagram illustrating an example configuration of the depth map combination unit 363 in the sixth example of the three-dimensional conversion unit 130 in the embodiment of the present invention. As described above, the depth map combination unit 363 is designed to combine the depth map of the input image that is generated by the input-image depth map generation unit 361 with the depth map of the horopter plane that is generated by the horopter-plane depth map generation unit 362. The depth map combination unit 363 includes an average value calculation unit 3631, a subtractor 3632, and an adder 3633.

The average value calculation unit 3631 is designed to calculate the average value of depth maps for each input image. The subtractor 3632 is designed to subtract the average value of depth maps for each input image from a depth map for each pixel of the input image. Thus, the AC components of the depth maps with respect to the average value as the center value are obtained. The adder 3633 is designed to add the AC components of the depth maps of the input image supplied from the subtractor 3632 to the depth map of the horopter plane. Thus, a combined depth map on the horopter plane can be obtained.

Figure 28:
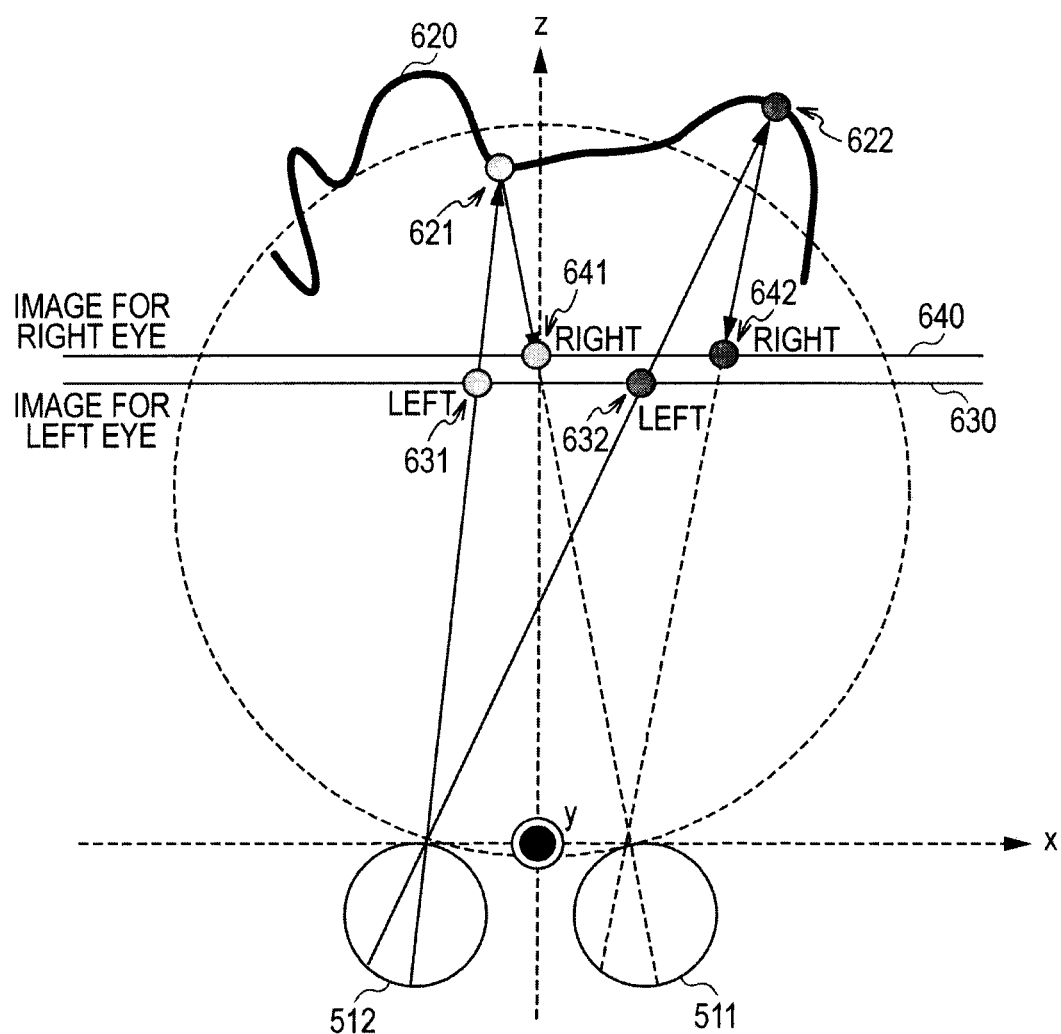
FIG. 28 is a diagram illustrating an example of a stereo image generated by the sixth example of the three-dimensional conversion unit 130 in the embodiment of the present invention.

FIG. 28 is a diagram illustrating an example of a stereo image generated by the sixth example of the three-dimensional conversion unit 130 in the embodiment of the present invention. In this example, an input non-stereo image is projected an image for left eye 630 onto a curved plane 620 corresponding to depth maps, and is projected onto an image for right eye 640 corresponding to respective points on the curved plane 620.

For example, a point 631 on the image for left eye 630, which is viewed from the left eye 512, is projected to a point 621 on the curved plane 620. Then, when the point 621 is viewed with the right eye 511, the point 621 is projected to a point 641 on the image for right eye 640. Similarly, a point 632 on the image for left eye 630, which is viewed from the left eye 512, is projected to a point 622 on the curved plane

620. Then, when the point 622 is viewed with the right eye 511, the point 622 is projected to a point 642 on the image for right eye 640.

Note that although in this figure, for convenience of explanation, the image for left eye 630 and the image for right eye 640 are illustrated as being shifted in position relative to each other in the z direction, in actuality, both are positioned on the same planar plane.

Figure 29:
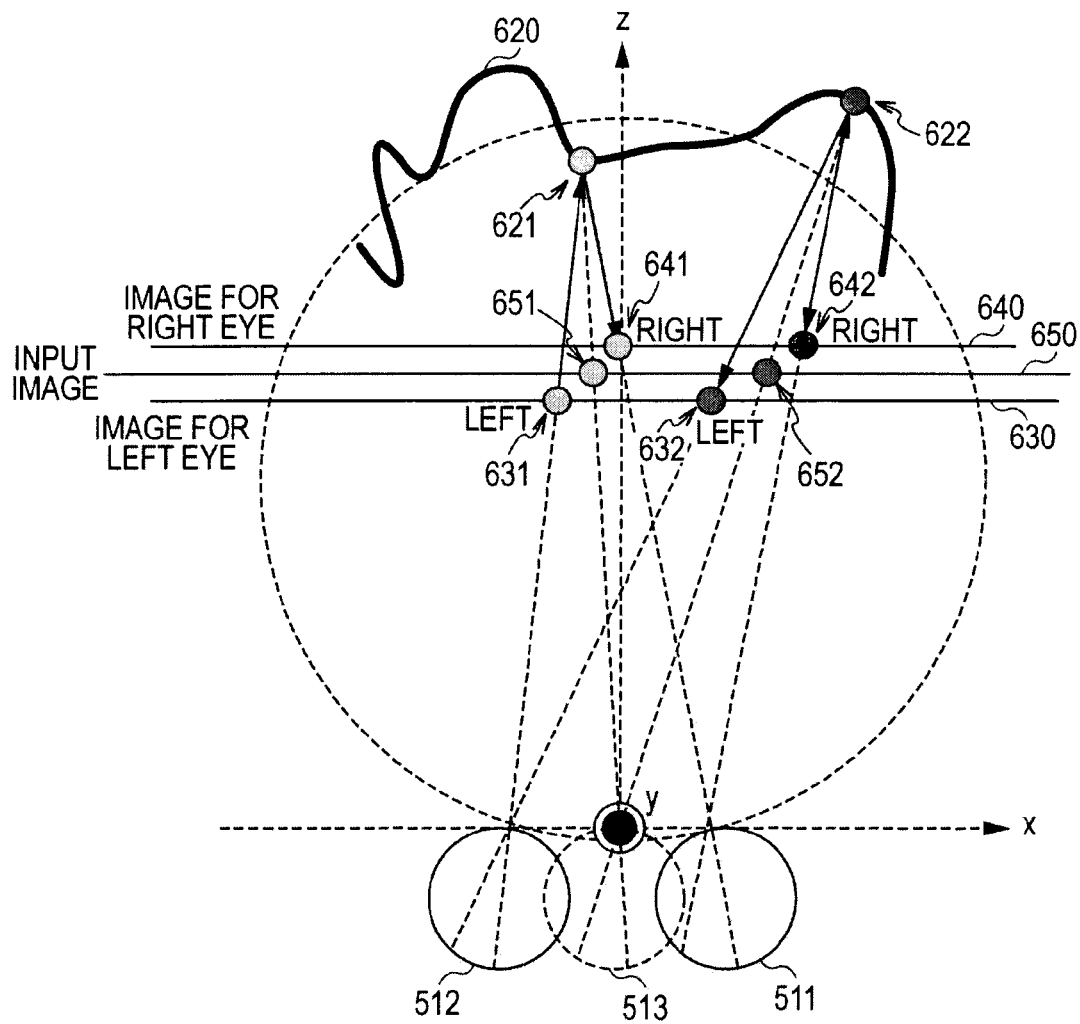
FIG. 29 is a diagram illustrating another example of a stereo image generated by the sixth example of the three-dimensional conversion unit 130 in the embodiment of the present invention.

FIG. 29 is a diagram illustrating another example of a stereo image generated by the sixth example of the three-dimensional conversion unit 130 in the embodiment of the present invention. In this figure, an input non-stereo image is projected as an image (input image 650) that is viewed from a center 513 between the right eye and the left eye onto a curved plane 620 corresponding to depth maps, and is projected onto an image for left eye 630 and an image for right eye 640 corresponding to respective points on the curved plane 620.

For example, a point 651 on the input image 650, which is viewed from the center 513, is projected to a point 621 on the curved plane 620. Then, when the point 621 is viewed with the left eye 512, the point 621 is projected to a point 631 on the image for left eye 630. When the point 621 is viewed with the right eye 511, the point 621 is projected to a point 641 on the image for right eye 640. Similarly, when a point 652 on the input image 650, which is viewed from the center 513, the point 652 is projected to a point 622 on the curved plane 620. Then, when the point 622 is viewed with the left eye 512, the point 622 is projected to a point 632 on the image for left eye 630. When the point 622 is viewed with the right eye 511, the point 622 is projected to a point 642 on the image for right eye 640.

Note that although in this figure, for convenience of explanation, the image for left eye 630, the image for right eye 640, and the input image 650 are illustrated as being shifted in position relative to one another in the z direction, in actuality, all of them are positioned on the same planar plane.

In this manner, in the sixth example of the three-dimensional conversion unit 130 in the embodiment of the present invention, a depth map that is based on degree-of-depth information is combined with stereoscopic vision in which the horopter plane explained with reference to other embodiments is utilized, thereby enabling the generation of a more stereoscopic stereo image.

Note that the embodiment of the present invention illustrates an example for embodying the present invention, and, as described above, has respectively correspondence relationships with specific claimed matters in CLAIMS. However, the present invention is not to be limited to the embodiment, and a variety of modifications can be made without departing from the scope of the present invention.

Additionally, the processing procedures explained in the embodiment of the present invention may be regarded as methods having the above series of procedures, or, additionally, may be regarded as a program for causing a computer to execute the above series of procedures or a recording medium storing the program. This recording medium can be implemented using, for example, a CD (Compact Disc), an MD (MiniDisc), a DVD (Digital Versatile Disk), a memory card, a Blu-ray Disc (registered trademark)), or the like.

EXPLANATION OF REFERENCE NUMERALS

110 image signal input unit
120 signal processing unit
130 three-dimensional conversion unit
140 parameter setting unit
150 observation distance measurement unit
160 post-processing unit
170 format conversion unit
180 source selection unit
190 display unit
311, 321, 331, 341 horopter-plane image projection unit
316, 326, 336, 346, 356, 366 display surface right-eye projection unit
317, 327, 337, 347, 357, 367 display surface left-eye projection unit
322, 332, 342 convergence point setting unit
343 scaling unit
354 tilt-shift plane right-eye setting unit
355 tilt-shift plane left-eye setting unit
361 input-image depth map generation unit
362 horopter-plane depth map generation unit
363 depth map combination unit
520 horopter circle
530 horopter image
540, 570 display surface
620 curved plane after combination
630 image for left eye
640 image for right eye
650 input image

The invention claimed is:

1. A stereoscopic image generation apparatus comprising: processing circuitry configured to
project a two-dimensional input image data onto an imaginary cylindrical plane including an imaginary circle to generate a cylindrical image data using imaginary cylindrical plane information, wherein the imaginary cylindrical plane is configured such that a retinal image of a point on the imaginary circle formed in the right eye and a retinal image of the point formed in the left eye are identical, and wherein the imaginary circle is a horopter circle with a circumference tangent to the left eye, the right eye and a point of convergence; and
project the cylindrical image data onto an imaginary flat display surface with reference to each of the two eyes to generate a first display image for the right eye by calculating a corresponding point on the imaginary flat display surface corresponding to a point on the imaginary cylindrical plane when viewed by the right eye for each point on the imaginary cylindrical plane using the imaginary cylindrical plane information, and a second display image for the left eye by calculating a corresponding point on the imaginary flat display surface corresponding to a point on the imaginary cylindrical plane when viewed by the left eye for each point on the imaginary cylindrical plane using the imaginary cylindrical plane information, wherein the first display image and the second display image are different, and wherein a retinal image formed in the right eye corresponding to the first display image and a retinal image formed in the left eye corresponding to the second display image have no binocular disparity.

2. The stereoscopic image generation apparatus according to claim 1, wherein the imaginary circle has a radius that is set in accordance with an assumed observation distance or a display size.

3. The stereoscopic image generation apparatus according to claim 2, wherein the processing circuitry is further configured to measure a distance between the imaginary flat display surface and an observation position, wherein the radius of the imaginary circle is set in accordance with an observation distance measured by the processing circuitry.

4. The stereoscopic image generation apparatus according to claim 1, wherein the imaginary circle has a radius that is set so that the degree of distortion in the first display image and the second display image is smaller than a predetermined threshold.

5. The stereoscopic image generation apparatus according to claim 1, wherein
the processing circuitry is further configured to
generate degree-of-depth information using the two-dimensional input image;
combine the degree-of-depth information with the cylindrical image; and
project the cylindrical image with the degree-of-depth information combined therewith onto the imaginary flat display surface to generate the first display image and the second display image.

6. The stereoscopic image generation apparatus according to claim 1, wherein the point of convergence is set so that a degree of distortion in the first display image and the second display image falls within an acceptable range.

7. The stereoscopic image generation apparatus according to claim 1, wherein the imaginary cylindrical plane information includes at least one of horopter circle information that identifies a size of the horopter circle, interocular distance information that identifies a distance between the right eye and the left eye, and observation distance information that identifies an assumed observation distance for the two-dimensional input image data.

8. A stereoscopic image generation apparatus comprising:
processing circuitry configured to
project a two-dimensional input image data onto imaginary two-dimensional planes that are respectively perpendicular to lines of sight of two eyes to generate data of cylindrical irradiation images respectively corresponding to the two eyes of an observer, wherein the lines of sight of the two eyes converge at a point on an imaginary cylindrical plane including an imaginary circle, wherein the imaginary circle is a horopter circle, wherein the horopter circle's circumference is tangent to the left eye, the right eye and the point of convergence, wherein a convergence angle of one convergence point on the horopter circle is equal to the convergence angle of any other point on the horopter circle, and wherein the data of cylindrical irradiation images corresponding to data of images on points on the imaginary cylindrical plane when viewed by the two eyes; and
project the corresponding data of cylindrical irradiation images onto an imaginary flat display surface with reference to the two eyes to generate a first display image for the right eye by calculating a corresponding point on the imaginary flat display surface corresponding to a point on the imaginary cylindrical plane when viewed by the right eye for each point on the imaginary cylindrical plane, and a second display image for the left eye by calculating a corresponding point on the imaginary flat display surface corresponding to a point on the imaginary cylindrical plane when viewed by the left eye for each point on the imaginary cylindrical plane, wherein the first display image and the second display image are different, and wherein a retinal image formed in the right eye corresponding to the first display image and a retinal image formed in the left eye corresponding to the second display image are identical and have no binocular disparity.

9. The stereoscopic image generation apparatus according to claim 8, wherein imaginary positions of the data of cylindrical irradiation images are set in accordance with an assumed observation distance.

10. The stereoscopic image generation apparatus according to claim 9, the processing circuitry is further configured to measure a distance between the imaginary flat display surface and an observation position of the observer, wherein the imaginary positions of the data of cylindrical irradiation images are set in accordance with an observation distance measured by the processing circuitry.

11. A stereoscopic image generation method comprising:
projecting, using processing circuitry, a two-dimensional input image data onto an imaginary cylindrical plane including an imaginary circle to generate a cylindrical image data using imaginary cylindrical plane information, wherein the cylindrical imaginary plane is configured such that a retinal image of a point on the imaginary circle formed in the right eye and a retinal image of the point formed in the left eye are identical, and wherein the imaginary circle is a horopter circle with a circumference tangent to the left eye, the right eye and a point of convergence; and
projecting, using the processing circuitry, the cylindrical image data onto an imaginary flat display surface with reference to each of the two eyes to generate a first display image for the right eye by calculating a corresponding point on the imaginary flat display surface corresponding to a point on the imaginary cylindrical plane when viewed by the right eye for each point on the imaginary cylindrical plane using the imaginary cylindrical plane information, and a second display image for the left eye by calculating a corresponding point on the imaginary flat display surface corresponding to a point on the imaginary cylindrical plane when viewed by the left eye for each point on the imaginary cylindrical plane using the imaginary cylindrical plane information, wherein the first display image and the second display image are different, and wherein a retinal image formed in the right eye corresponding to the first display image and a retinal image formed in the left eye corresponding to the second display image have no binocular disparity.

12. A stereoscopic image generation method comprising:
projecting, using processing circuitry, a two-dimensional input image data onto imaginary two-dimensional planes that are respectively perpendicular to lines of sight of two eyes of an observer to generate data of cylindrical irradiation images respectively corresponding to the two eyes, wherein the lines of sight of the two eyes converge at a point on an imaginary cylindrical plane including an imaginary circle, wherein the imaginary circle is a horopter circle, wherein the horopter circle's circumference is tangent to the left eye, the right eye and the point of convergence, wherein a convergence angle of one convergence point on the horopter circle is equal to the convergence angle of any other point on the horopter circle, and wherein the data of cylindrical irradiation images corresponding to data of images on points on the imaginary cylindrical plane when viewed by the two eyes; and
projecting, using processing circuitry, the corresponding data of cylindrical irradiation images onto an imaginary flat display surface with reference to the two eyes to generate a first display image for the right eye by calculating a corresponding point on the imaginary flat display surface corresponding to a point on the imaginary cylindrical plane when viewed by the right eye for each point on the imaginary cylindrical plane, and a second display image for the left eye by calculating a corresponding point on the imaginary flat display surface corresponding to a point on the imaginary cylindrical plane when viewed by the left eye for each point on the imaginary cylindrical plane, wherein the first display image and the second display image are different, and wherein a retinal image formed in the right eye corresponding to the first display image and a retinal image formed in the left eye corresponding to the second display image are identical and have no binocular disparity.

13. A non-transitory computer-readable storage medium storing instructions that, when executed by a processor, cause the processor to perform a stereoscopic image generation method, the method comprising:

projecting a two-dimensional input image data onto an imaginary cylindrical plane including an imaginary circle to generate a cylindrical image data using imaginary cylindrical plane information, wherein the imaginary cylindrical plane is configured such that a retinal image of a point on the imaginary circle formed in the right eye and a retinal image of the point formed in the left eye are identical, and wherein the imaginary circle is a horopter circle with a circumference tangent to the left eye, the right eye and a point of convergence; and projecting the cylindrical image data onto an imaginary flat display surface with reference to each of the two eyes to generate a first display image for the right eye by calculating a corresponding point on the imaginary flat display surface corresponding to a point on the imaginary cylindrical plane when viewed by the right eye for each point on the imaginary cylindrical plane using the imaginary cylindrical plane information, and a second display image for the left eye by calculating a corresponding point on the imaginary flat display surface corresponding to a point on the imaginary cylindrical plane when viewed by the left eye for each point on the imaginary cylindrical plane using the imaginary cylindrical plane information, wherein the first display image and the second display image are different, and wherein a retinal image formed in the right eye corresponding to the first display image and a retinal image formed in the left eye corresponding to the second display image have no binocular disparity.

14. A non-transitory computer-readable storage medium storing instructions that, when executed by a processor, cause the processor to perform a stereoscopic image generation method, the method comprising:

projecting a two-dimensional input image data onto imaginary two-dimensional planes that are respectively perpendicular to lines of sight of two eyes of an observer to generate data of cylindrical irradiation images respectively corresponding to the two eyes, wherein the lines of sight of the two eyes converge at a point on an imaginary cylindrical plane including an imaginary circle, wherein the imaginary circle is a horopter circle, wherein the horopter circle's circumference is tangent to the left eye, the right eye and the point of convergence, wherein a convergence angle of one convergence point on the horopter circle is equal to the convergence angle of any other point on the horopter circle, and wherein the data of cylindrical irradiation images corresponding to data of images on points on the imaginary cylindrical plane when viewed by the two eyes; and projecting the corresponding data of cylindrical irradiation images onto an imaginary flat display surface with reference to the two eyes to generate a first display image for the right eye by calculating a corresponding point on the imaginary flat display surface corresponding to a point on the imaginary cylindrical plane when viewed by the right eye for each point on the imaginary cylindrical plane, and a second display image for the left eye by calculating a corresponding point on the imaginary flat display surface corresponding to a point on the imaginary cylindrical plane when viewed by the left eye for each point on the imaginary cylindrical plane, wherein the first display image and the second display image are different, and wherein a retinal image formed in the right eye corresponding to the first display image and a retinal image formed in the left eye corresponding to the second display image are identical and have no binocular disparity.

* * * * *